(12) United States Patent
Saika

(10) Patent No.: US 7,899,985 B2
(45) Date of Patent: Mar. 1, 2011

(54) METHOD OF SWITCHING DISTRIBUTED STORAGE MODES IN GNS

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 12/007,228

(22) Filed: Jan. 8, 2008

(65) Prior Publication Data

US 2008/0189470 A1 Aug. 7, 2008

(30) Foreign Application Priority Data

Feb. 5, 2007 (JP) .............................. 2007-025387

(51) Int. Cl.
*G06F 12/10* (2006.01)
(52) U.S. Cl. ................. 711/111; 711/154; 711/E12.019
(58) Field of Classification Search .................. 711/111, 711/154
See application file for complete search history.

(56) References Cited

U.S. PATENT DOCUMENTS

2002/0120763 A1* 8/2002 Miloushev et al. .......... 709/230

FOREIGN PATENT DOCUMENTS

JP 2006-172217 12/2004

\* cited by examiner

*Primary Examiner*—Reginald G Bragdon
*Assistant Examiner*—Kenneth M Lo
(74) *Attorney, Agent, or Firm*—Foley & Lardner LLP

(57) ABSTRACT

Provided is a computer system including: one first server; a plurality of second servers; and a plurality of storage subsystems, in which the computer system applies to each file stored in the storage subsystems one of a first file storage mode and a second file storage mode in a distributive manner, the first server integrates directory structures that are unique throughout the respective second servers to provide the integrated directory structures as a directory structure that is unique throughout the computer system to the client computer, and at least one of the first server and the second servers analyzes a utilization state of the file and switches a file storage mode that is currently applied to the file to the other file storage mode based on a change in the analyzed file utilization state.

8 Claims, 21 Drawing Sheets

| 911 | 912 | 913 |
| --- | --- | --- |
| GLOBAL PATH | NAS NAME | LOCAL PATH |
| /GNS-Root/Dir-01/Dire-02/FS3 | NAS-03 | /mnt/FS3 |
| /GNS-Root/Dir-01/Dire-02/FS4 | NAS-04 | /mnt/FS4 |
| /GNS-Root/Dir-01/FS2 | NAS-02 | /mnt/FS2 |
| /GNS-Root/FS1 | NAS-01 | /mnt/FS1 |
| /GNS-Root/FS5 | - | /mnt/FS5 |

91

GNS DEFINITION TABLE

*FIG. 4*

| 921 | 922 |
|---|---|
| SIZE | SECTION COUNT |
| LESS THAN XX BYTES | 2 |
| EQUAL TO OR MORE THAN XX BYTES AND LESS THAN XX BYTES | 3 |
| ⋮ | ⋮ |

92
FILE DIVISION POLICY

FIG. 8

| 931 | 932 | 933 |
|---|---|---|
| LOCAL PATH | NAS NAME | FILE SECTION PATH |
| /mnt/FS5/File-A | NAS-02 | /mnt/FS7/File-A[1/3] |
|  | NAS-03 | /mnt/FS8/File-A[2/3] |
|  | NAS-04 | /mnt/FS9/File-A[3/3] |

93
FILE SECTION MANAGEMENT TABLE

FIG. 9

| VIEWPOINT | DISTRIBUTED STORAGE MODE A | DISTRIBUTED STORAGE MODE B | DISTRIBUTED STORAGE MODE C |
|---|---|---|---|
| STORAGE OF LARGE-SIZED FILE | × | ○ | ○ |
| STORAGE OF SMALL-SIZED FILE | ○ | × | △ |
| ACCESS CONCENTRATION (STORAGE BOTTLENECK) | × | ○ | ○ |
| CHANGE OF DISTRIBUTION GRANULARITY IN DIVIDED STORAGE | × | ○ | × |

FIG. 11

```
DISTRIBUTED STORAGE MODE A:
FILE SIZE < 1GB

DISTRIBUTED STORAGE MODE B:
FILE SIZE ≧ 1GB
AND WRITE FREQUENCY ≧ 100 TIMES/Hour DISTRIBUTED STORAGE MODE C:
FILE SIZE ≧ 1GB
AND WRITE FREQUENCY < 100 TIMES/Hour
```
138

DISTRIBUTED STORAGE MODE SELECTION POLICY

FIG. 12

| NAS NAME (941) | CURRENTLY ADOPTED DISTRIBUTED STORAGE MODE (942) | ADOPTABLE DISTRIBUTED STORAGE MODE (943) |
|---|---|---|
| NAS-01 | A | A,B |
| NAS-02 | A | A,C |
| NAS-03 | B | B |
| NAS-04 | B,C | B,C |
| ⋮ | ⋮ | ⋮ |

94 DISTRIBUTED STORAGE MODE MANAGEMENT TABLE

FIG. 13

| GLOBAL PATH (951) | FILE NAME (952) | NEXT-APPLIED DISTRIBUTED STORAGE MODE (953) |
|---|---|---|
| /GNS-Root/FS1 | file-A | B |
| ⋮ | ⋮ | ⋮ |

95 DISTRIBUTED STORAGE MODE CHANGE MANAGEMENT TABLE

FIG. 14

| 961 | 962 | 963 | 964 |
|---|---|---|---|
| DATE/TIME | FILE PATH | PRE-SWITCH DISTRIBUTED STORAGE MODE | POST-SWITCH DISTRIBUTED STORAGE MODE |
| 13:00:00 DECEMBER 1, 2006 | /GNS-Root/FS1/a.txt | A | B |
| ⋮ | ⋮ | ⋮ | ⋮ |

96
DISTRIBUTED STORAGE MODE CHANGE HISTORY TABLE

FIG. 15

| 971 | 972 | 973 | 974 |
|---|---|---|---|
| DATE/TIME | DISTRIBUTED STORAGE MODE A APPLICATION COUNT | DISTRIBUTED STORAGE MODE B APPLICATION COUNT | DISTRIBUTED STORAGE MODE C APPLICATION COUNT |
| 13:00:00 DECEMBER 1, 2006 | 100 | 250 | 50 |
| ⋮ | ⋮ | ⋮ | ⋮ |

97
DISTRIBUTED STORAGE MODE APPLICATION STATE HISTORY TABLE

FIG. 16

<DISTRIBUTED STORAGE MODE CHANGE NOTIFICATION>

DISTRIBUTED STORAGE MODE APPLIED TO THE FOLLOWING FILE HAS BEEN CHANGED

CHANGED FILE: file-A

SPECIFICS OF THE CHANGE: SWITCHED FROM DISTRIBUTED STORAGE MODE A TO DISTRIBUTED STORAGE MODE B

FIG. 20

<GNS ENVIRONMENT CHANGE NOTIFICATION>

FILE SYSTEM HAS BEEN ADDED TO THE FOLLOWING NAS SERVER

CHANGED NAS SERVER : NAS-05

SPECIFICS OF THE CHANGE: FILE SYSTEM ADOPTING
DISTRIBUTED STORAGE MODE C HAS BEEN ADDED

FIG. 23

<GNS ENVIRONMENT CHANGE REQUEST>

RECOMMENDS TO ADD FILE SYSTEM TO THE FOLLOWING NAS SERVER

NAS SERVER TO BE CHANGED : NAS-05

SPECIFICS OF THE CHANGE: ADDITION OF FILE SYSTEM
ADOPTING DISTRIBUTED STORAGE MODE C

SIZE : [　　　　　　　]   [ ADD ] [ CANCEL ]

FIG. 24

METHOD OF SWITCHING DISTRIBUTED STORAGE MODES IN GNS

CLAIM OF PRIORITY

The present application claims priority from Japanese patent application P2007-25387 filed on Feb. 5, 2007, the content of which is hereby incorporated by reference into this application.

BACKGROUND

This invention relates to a computer system having a plurality of servers and a plurality of storage subsystems, and more specifically, to a technique of storing files in storage subsystems.

JP 2006-172217 A discloses a technique called "global name space" (GNS). In GNS, a plurality of network attached storage (NAS) elements are provided as a single NAS element to a client computer.

There has also been known a distributed file system (cluster file system). In a cluster file system, a single file is distributed for storage among a plurality of NAS elements.

SUMMARY

Usually, one file is managed by one file system of NAS. A file system that manages a large-sized file is therefore accessed intensively.

In a cluster file system where a large-sized file is distributed for storage among a plurality of NAS elements, an access concentration on a specific file system is avoided. However, file distribution can cause overhead when distributed pieces of a file are small in size.

This invention has been made in view of the above problem, and it is therefore an object of this invention to provide a computer system that stores files in storage subsystems suitably.

According to an exemplary embodiment of this invention, there is provided a file storage method for a computer system having one first server which is accessed by a client computer, a plurality of second servers which are coupled to the first server via a network, and a plurality of storage subsystems which are coupled to the second servers, comprising: applying to each file stored in the storage subsystems one of a first file storage mode in which one file is stored in one of the storage subsystems and a second file storage mode in which one file is stored in two or more of the storage subsystems in a distributive manner; integrating, by the first server, directory structures that are unique throughout the respective second servers to provide the integrated directory structures as a directory structure that is unique throughout the computer system to the client computer; and analyzing, by at least one of the first server and the second servers, a utilization state of the file and switching a file storage mode that is currently applied to the file to the other file storage mode based on a change in the analyzed file utilization state.

According to the representative aspect of this invention, files can be stored in storage subsystems suitably.

BRIEF DESCRIPTION OF THE DRAWINGS

The present invention can be appreciated by the description which follows in conjunction with the following figures, wherein:

FIG. 4 is a configuration diagram of the GNS definition table according to the embodiment of this invention;

FIG. 8 is a configuration diagram of the file division policy according to the embodiment of this invention;

FIG. 9 is a configuration diagram of the file section management table according to the embodiment of this invention;

FIG. 11 is an explanatory diagram of characteristics of the distributed storage modes A to C according to the embodiment of this invention;

FIG. 12 is an explanatory diagram of the distributed storage mode selection policy according to the embodiment of this invention;

FIG. 13 is a configuration diagram of the distributed storage mode management table according to the embodiment of this invention;

FIG. 14 is a configuration diagram of the distributed storage mode change management table according to the embodiment of this invention;

FIG. 15 is a configuration diagram of the distributed storage mode change history table according to the embodiment of this invention;

FIG. 16 is a configuration diagram of the distributed storage mode application state history table according to the embodiment of this invention;

FIG. 20 is an explanatory diagram of the distributed storage mode change notification screen which is displayed by the management computer according to the embodiment of this invention;

FIG. 23 is an explanatory diagram of the GNS environment change notification screen which is displayed by the management computer according to the embodiment of this invention;

FIG. 24 is an explanatory diagram of the GNS environment change request screen which is displayed by the management computer according to the embodiment of this invention;

DETAILED DESCRIPTION OF THE PREFERRED EMBODIMENT

An embodiment of this invention will be described below with reference to the accompanying drawings.

Figure 1:
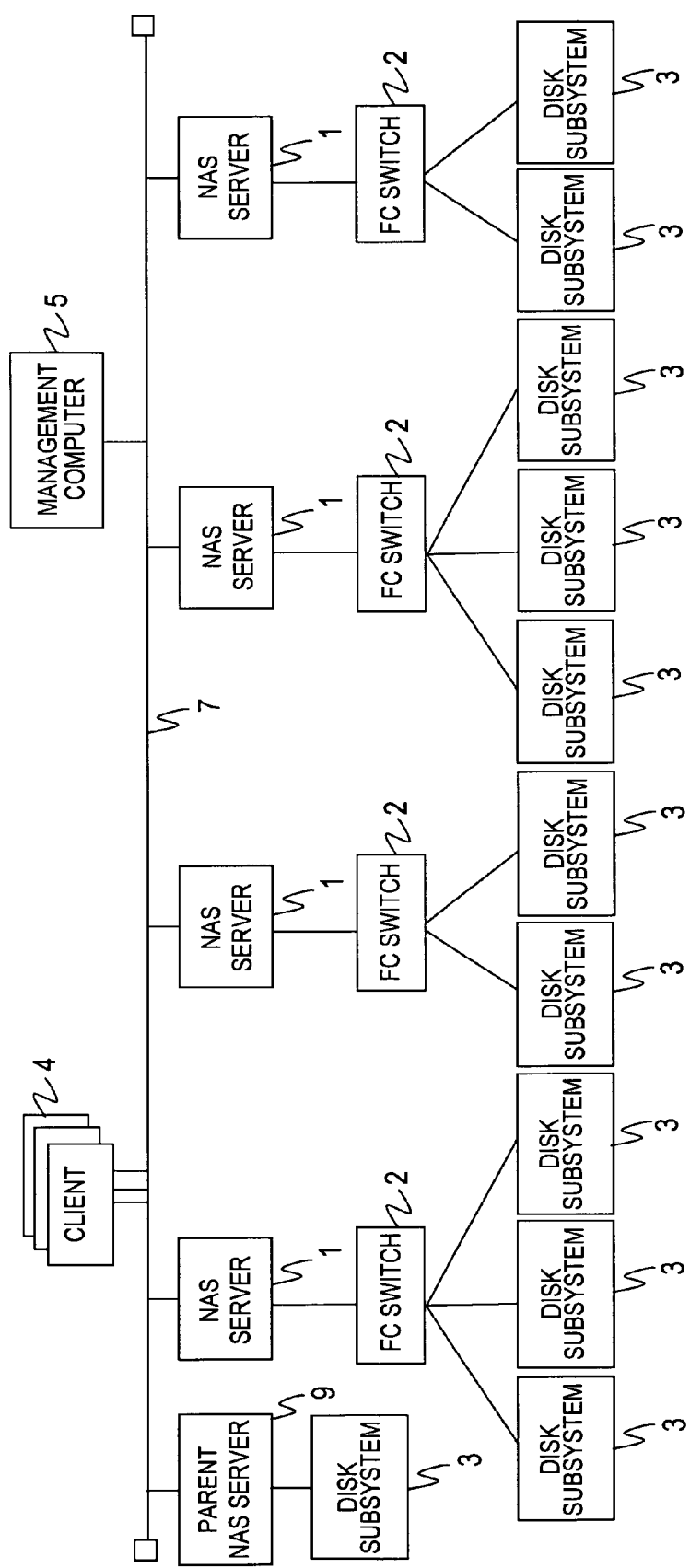
FIG. 1 is a block diagram showing the configuration of a computer system according to the embodiment of this invention.

FIG. 1 is a block diagram showing the configuration of a computer system according to the embodiment of this invention.

The computer system has parent NAS, NAS, a client computer 4, a management computer 5, and a local area network (LAN) 7.

The parent NAS has a parent NAS server 9 and a disk subsystem 3. The NAS has a NAS server 1, a fibre channel (FC) switch 2, and its own disk subsystem 3.

The LAN 7 interconnects the parent NAS server 9, the NAS server 1, the client computer 4, and the management computer 5. The FC switch 2 connects the NAS server 1 and the disk subsystem 3 to each other.

The NAS server 1 is connected to one or more disk subsystems 3 via the FC switch 2. The parent NAS server 9, which, in FIG. 1, is connected to one disk subsystem 3, may be connected to a plurality of disk subsystems 3.

Each disk subsystem 3 stores data requested by the client computer 4 to be written. Details of the disk subsystem 3 will be described with reference to FIG. 2.

The computer system may have a semiconductor memory device in place of the disk subsystem 3. The semiconductor memory device uses a flash memory or the like as a memory device.

The NAS server 1 provides a file sharing service to the client computer 4. For instance, the NAS server 1 receives a file input/output request and converts the received file input/output request into a block input/output request. The NAS server 1 then sends the block input/output request obtained by the conversion to the disk subsystem 3. Details of the NAS server 1 will be described with reference to FIG. 3.

The parent server 9 has a global name space (GNS) function in addition to the function of the NAS server 1. Details of GNS will be described with reference to FIG. 5.

The client computer 4 receives a file sharing service from the parent NAS server 9 and the NAS server 1. The client computer 4 sends a file input/output request to the parent NAS server 9 to receive the file sharing service.

The management computer 5 handles the overall management of this computer system.

Figure 2:
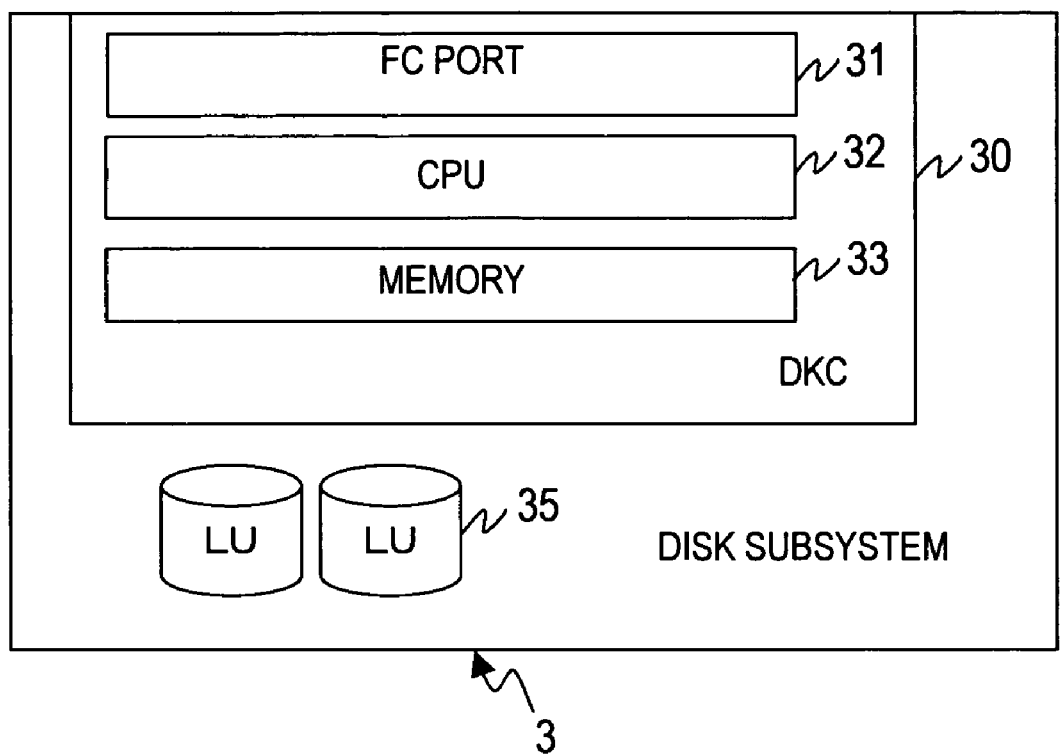
FIG. 2 is a block diagram showing the configuration of the disk subsystem in the computer system according to the embodiment of this invention.

FIG. 2 is a block diagram showing the configuration of the disk subsystem 3 in the computer system according to the embodiment of this invention.

The disk subsystem 3 has a disk controller (DKC) and a physical disk.

The physical disk stores data requested by the client computer 4 to be written. The disk controller provides the storage area of the physical disk to the NAS server 1 or the parent NAS server 9 as one or more logical volumes (LUs) 35.

The disk controller has an FC port 31, a CPU 32, and a memory 33. The FC port 31 is an interface connected to the NAS server 1 or the parent NAS server 9 via the FC switch 2. The CPU 32 performs various types of processing by executing a program stored in the memory 33.

The memory 33 stores a program executed by the CPU 32, information necessary for the CPU 32, and the like. For example, the memory 33 stores an IOP, which inputs and outputs data to and from the physical disk in accordance with a block input/output request received from the NAS server 1 or the parent NAS server 9.

Part of the memory 33 is used as a cache memory. The cache memory temporarily stores data to be written in the physical disk and data read out of the physical disk.

The LU 35 of the disk subsystem 3 that is connected to the parent NAS server 9 stores a GNS definition table 91, a file division policy 92, a file section management table 93, a distributed storage mode management table 94, a distributed storage mode change management table 95, distributed storage mode change history table 96, a distributed storage mode application state history table 97, and a distributed storage mode selection policy 138.

The GNS definition table 91 shows the association between a global path, which is used to identify a file system 134 uniquely throughout the computer system, and a local path, which is used to identify the file system 134 uniquely throughout the NAS server 1. Details of the GNS definition table 91 will be described with reference to FIG. 4.

The file division policy 92 shows how many sections a file is to be divided into. Details of the file division policy 92 will be described with reference to FIG. 8.

The file section management table 93 is used to manage storage destinations of a file to which a distributed storage mode B is applied. Details of the file section management table 93 will be described with reference to FIG. 9. Details of the distributed storage mode B will be described with reference to FIG. 7.

The distributed storage mode management table 94 shows a distributed storage mode that is currently adopted by the file system 134 in the NAS server 1, and a distributed storage mode that the file system 134 can adopt. Details of the distributed storage mode management table 94 will be described with reference to FIG. 13.

The distributed storage mode change management table 95 is used to manage a file for which a change should be made from one distributed storage mode to another. Details of the distributed storage mode change management table 95 will be described with reference to FIG. 14.

The distributed storage mode change history table 96 is used to manage a history of switches of distributed storage modes. Details of the distributed storage mode change history table 96 will be described with reference to FIG. 15.

The distributed storage mode application state history table 97 is used to manage, for each distributed storage mode, a history of the count of files to which the distributed storage mode is applied. Details of the distributed storage mode application state history table 97 will be described with reference to FIG. 16.

The distributed storage mode selection policy 138 is information for judging whether or not a distributed storage mode that is currently applied to a file needs to be changed to another distributed storage mode. The distributed storage mode selection policy 138 is stored also in the NAS server 1. Details of the distributed storage mode selection policy 138 will be described with reference to FIG. 12.

Figure 3:
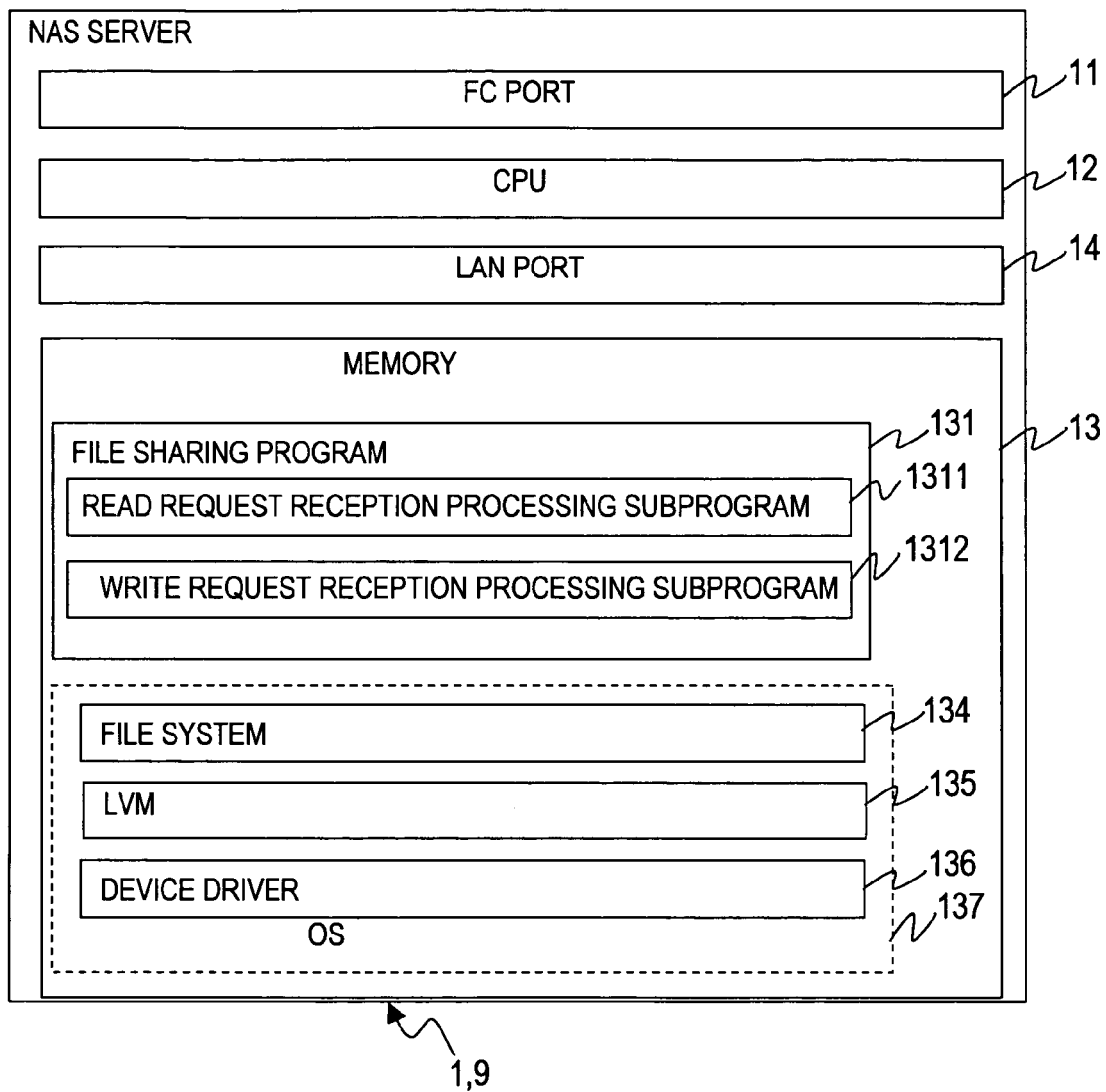
FIG. 3 is a block diagram showing the configuration of the NAS server in the computer system according to the embodiment of this invention.

FIG. 3 is a block diagram showing the configuration of the NAS server 1 in the computer system according to the embodiment of this invention.

The NAS server 1 has an FC port 11, a CPU 12, a memory 13, and a LAN port 14.

The FC port 11 is an interface connected to the disk subsystem 3 via the FC switch 2. The LAN port 14 is an interface connected to the client computer 4 and the management computer 5 via the LAN 7.

The CPU 12 performs various types of processing by executing a program stored in the memory 13.

The memory 13 stores a program executed by the CPU 12, information necessary for the CPU 12, and the like. Specifically, the memory 13 stores a file sharing program 131 and an OS 137.

The file sharing program 131 provides a file sharing service to the client computer 4. A file sharing protocol such as Network File System (NFS) or Common Internet File System (CIFS) is used between the NAS server 1 and the client computer 4. The file sharing program 131 contains a read request receiving sub-program 1311 and a write request receiving sub-program 1312.

The read request receiving sub-program 1311 receives a read request issued by the client computer 4 and performs processing that fulfills the received read request. Read processing executed by the read request receiving subprogram 1311 will be described in detail with reference to FIG. 17.

The write request receiving subprogram 1312 receives a write request issued by the client computer 4 and performs processing that fulfills the received write request. Write processing executed by the write request receiving subprogram 1312 will be described in detail with reference to FIG. 19.

The OS 137 controls the overall processing of the NAS server 1. The OS 137 contains the file system 134, a logical volume manager (LVM) 135, and a device driver 136.

The file system 134 provides data stored in the disk subsystem 3 to the client computer 4 and others as a file. For instance, the file system 134 converts a file input/output request into a block input/output request.

The LVM 135 provides a plurality of LUs 35 that are provided by the disk subsystem 3 to the file system 134 as one LU.

The device driver 136 sends a block input/output request to the disk subsystem 3, thereby inputting and outputting data to and from the disk subsystem 3.

The parent NAS server 9 has the same configuration as that of the NAS server 1, and a description on the configuration of the parent NAS server 9 will be omitted.

FIG. 4 is a configuration diagram of the GNS definition table 91 according to the embodiment of this invention.

The GNS definition table 91 contains a global path 911, a NAS name 912, and a local path 913.

The global path 911 indicates a path that is used to identify each file system 134 in the NAS server 1 uniquely throughout the computer system.

The NAS name 912 indicates an identifier unique to the NAS server 1 that has the file system 134 identified by the global path 911 of the record entry in question. In the case where the distributed storage mode B is applied to the file system 134 identified by the global path 911 of the record in question, no value is stored as the NAS name 912.

The local path 913 indicates a path that is used for unique identification of the file system 134 identified by the global path 911 of the record in question throughout the NAS server 1 identified by the NAS name 912 of the record.

Figure 5:
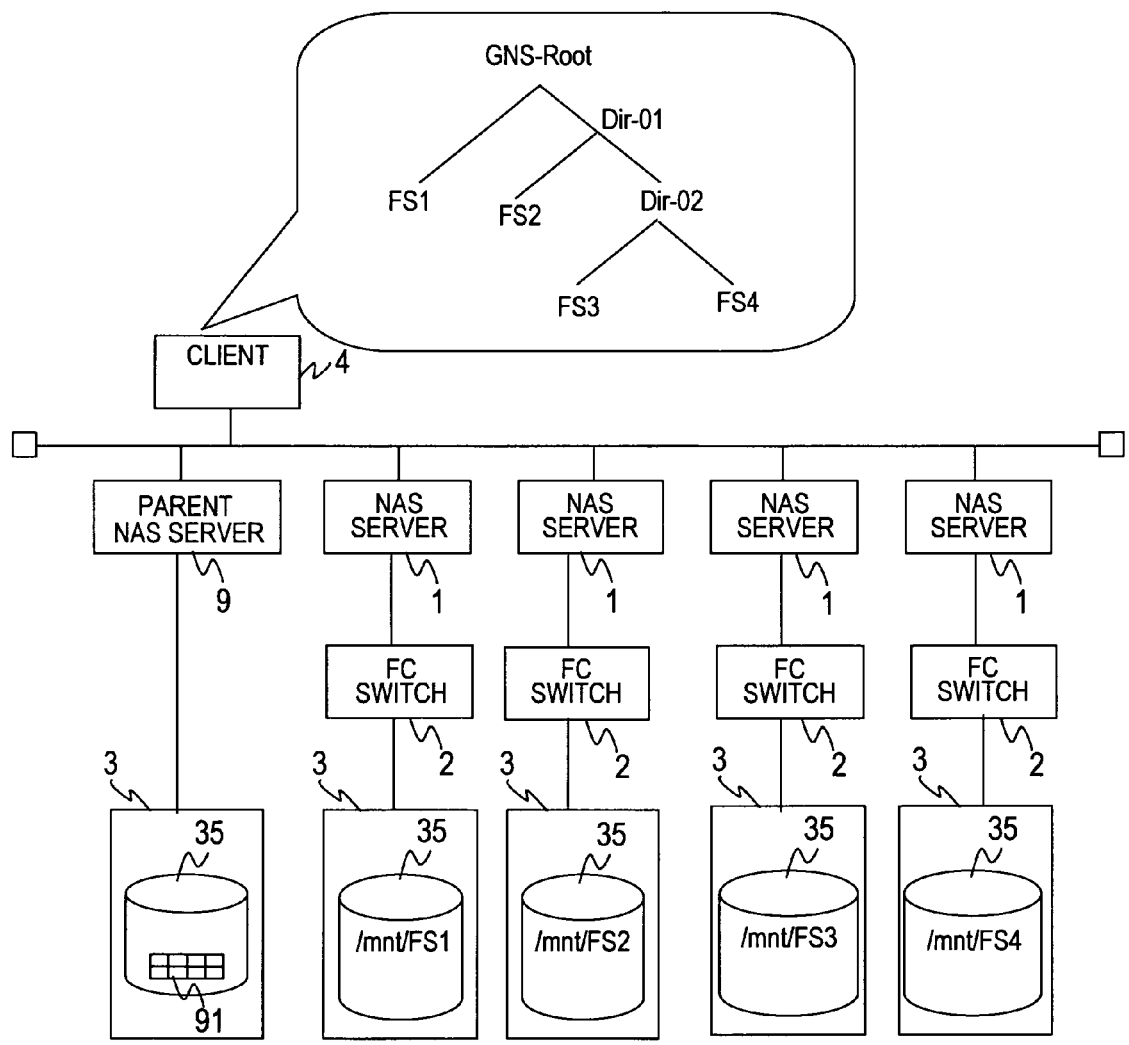
FIG. 5 is an explanatory diagram of GNS in the computer system according to the embodiment of this invention.

FIG. 5 is an explanatory diagram of GNS in the computer system according to the embodiment of this invention.

The parent NAS server 9 provides a plurality of file systems 134 in a plurality of NAS servers 1 as one tree view to the client computer 4.

As an example, a case will be described in which the GNS definition table 91 of FIG. 4 is stored in the LU 35 of the disk subsystem 3 that is connected to the parent NAS server 9.

In this example, the NAS server 1 that is identified by "NAS-01" has the file system 134 that is identified by "FS1". The NAS server 1 that is identified by "NAS-02" has the file system 134 that is identified by "FS2". The NAS server 1 that is identified by "NAS-03" has the file system 134 that is identified by "FS3". The NAS server 1 that is identified by "NAS-04" has the file system 134 that is identified by "FS4". Each file system 134 is mounted under a local directory "/mnt" of its NAS server 1.

The client computer 4 accesses the parent NAS server 9 to refer to a tree view as the one shown in the balloon of FIG. 5.

In the case where the client computer 4 is to access a file identified by "/GNS-Root/Dir-01/FS2/a.txt", the client computer 4 sends an access request that contains "/GNS-Root/Dir-01/FS2/a.txt" as an access destination to the parent NAS server 9. An access request is a write request, a read request, or the like.

Receiving the access request, the parent NAS server 9 chooses from the GNS definition table 91 a record entry whose global path 911 matches a global path "/GNS-Root/Dir-01/FS2" contained in the received access request. The parent NAS server 9 extracts the NAS name 912 and the local path name 913 from the chosen record.

The parent NAS server 9 thus recognizes the file identified by "/GNS-Root/Dir-01/FS2/a.txt" as a file provided by the file system 134 that is identified by the extracted local path 913, "/mnt/FS2". The file system 134 that is identified by the extracted local path 913, "/mnt/FS2", is located in the NAS server 1 that is identified by the extracted NAS name 912, "NAS-02".

The parent NAS server 9 accordingly converts the destination "/GNS-Root/Dir-01/FS2/a.txt" contained in the received access request into "/mnt/FS2/a.txt". The parent NAS server 9 sends the converted access request to the NAS server 1 that is identified by the extracted NAS name 912, "NAS-02".

Alternatively, the parent NAS server 9 may perform the following processing.

Upon reception of an access request, the parent NAS server 9 chooses from the GNS definition table 91 a record entry whose global path 911 matches a global path contained in the received access request. From the chosen record, the parent NAS server 9 extracts the NAS name 912 and the local path 913.

The parent NAS server 9 then sends the extracted NAS name 912 and local path 913 to the client computer 4. The client computer 4 sends an access request that contains the received NAS name 912 and local path 913 as an access destination to the NAS server 1 that is identified by the received NAS name 912.

This way, the client computer 4 can access a file without the intervention of the parent NAS server 9, and the load on the parent NAS server 9 is accordingly lessened.

Described next are three different distributed storage modes that are used in the embodiment of this invention. One of a distributed storage mode A, the distributed storage mode B and a distributed storage mode C is applied to a file.

Figure 6:
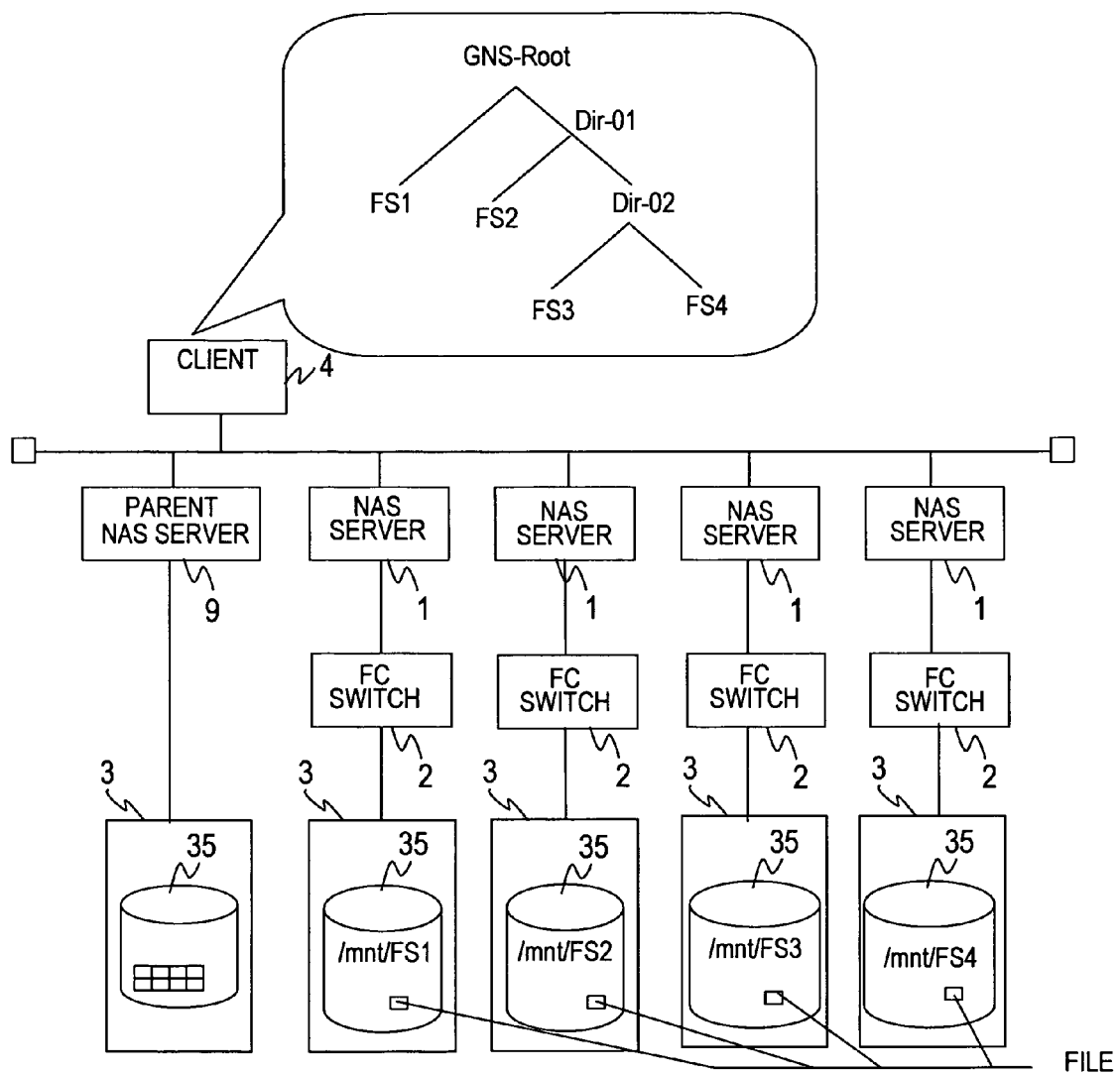
FIG. 6 is an explanatory diagram of the distributed storage mode A according to the embodiment of this invention.

FIG. 6 is an explanatory diagram of the distributed storage mode A according to the embodiment of this invention.

In the distributed storage mode A, one file is stored in one disk subsystem 3. In other words, according to the distributed storage mode A, a file is not divided.

Figure 7:
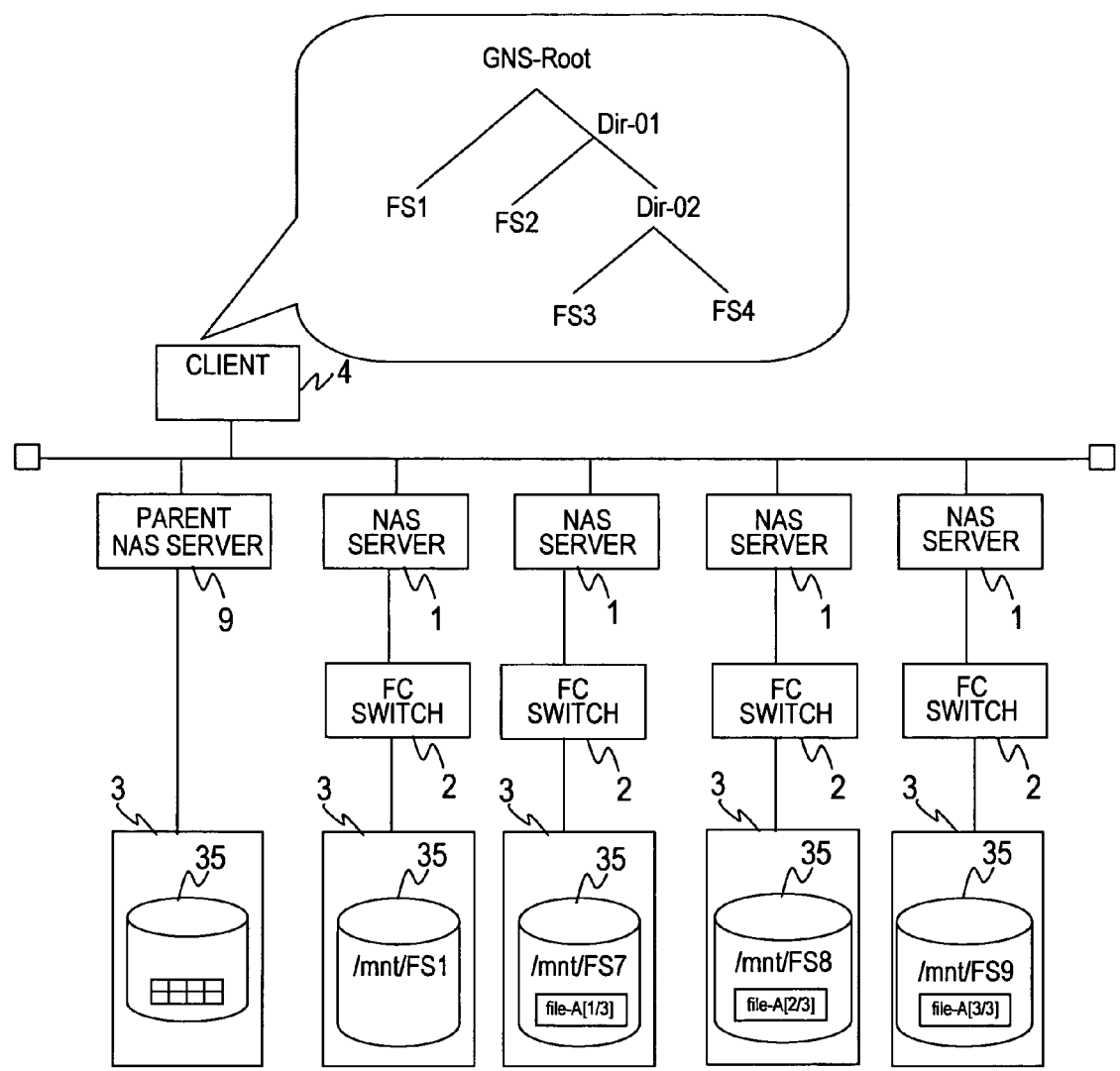
FIG. 7 is an explanatory diagram of the distributed storage mode B according to the embodiment of this invention.

FIG. 7 is an explanatory diagram of the distributed storage mode B according to the embodiment of this invention.

In the distributed storage mode B, one file is divided into a plurality of sections, which are stored in a plurality of NAS elements. In other words, according to the distributed storage mode B, one file is divided into sections and the file sections are stored in a plurality of disk subsystems 3 that are connected to different NAS servers 1 from one another.

The parent NAS server 9 manages file division. The LU 35 of the disk subsystem 3 that is connected to the parent NAS server 9 therefore stores the file division policy 92 and the file section management table 93.

FIG. 8 is a configuration diagram of the file division policy 92 according to the embodiment of this invention.

The file division policy 92 contains a size 921 and a section count 922. The size 921 indicates the size of a file to which the distributed storage mode B is applied. The section count 922 indicates the count of sections into which a file that meets the size 921 of the record entry in question should be divided.

FIG. 9 is a configuration diagram of the file section management table 93 according to the embodiment of this invention.

The file section management table 93 contains a local path 931, a NAS name 932, and a file section path 933.

The local path 931 indicates a path that is used to identify a file to which the distributed storage mode B is applied. The NAS name 932 indicates an identifier unique to the NAS server 1 connected to the disk subsystem 3 that stores a section of the file identified by the local path 931 of the record entry in question. The file section path 933 indicates a path that is used for unique identification of the file section identified by the local path 931 of the record in question throughout the NAS server 1 identified by the NAS name 932 of the record.

Figure 10:
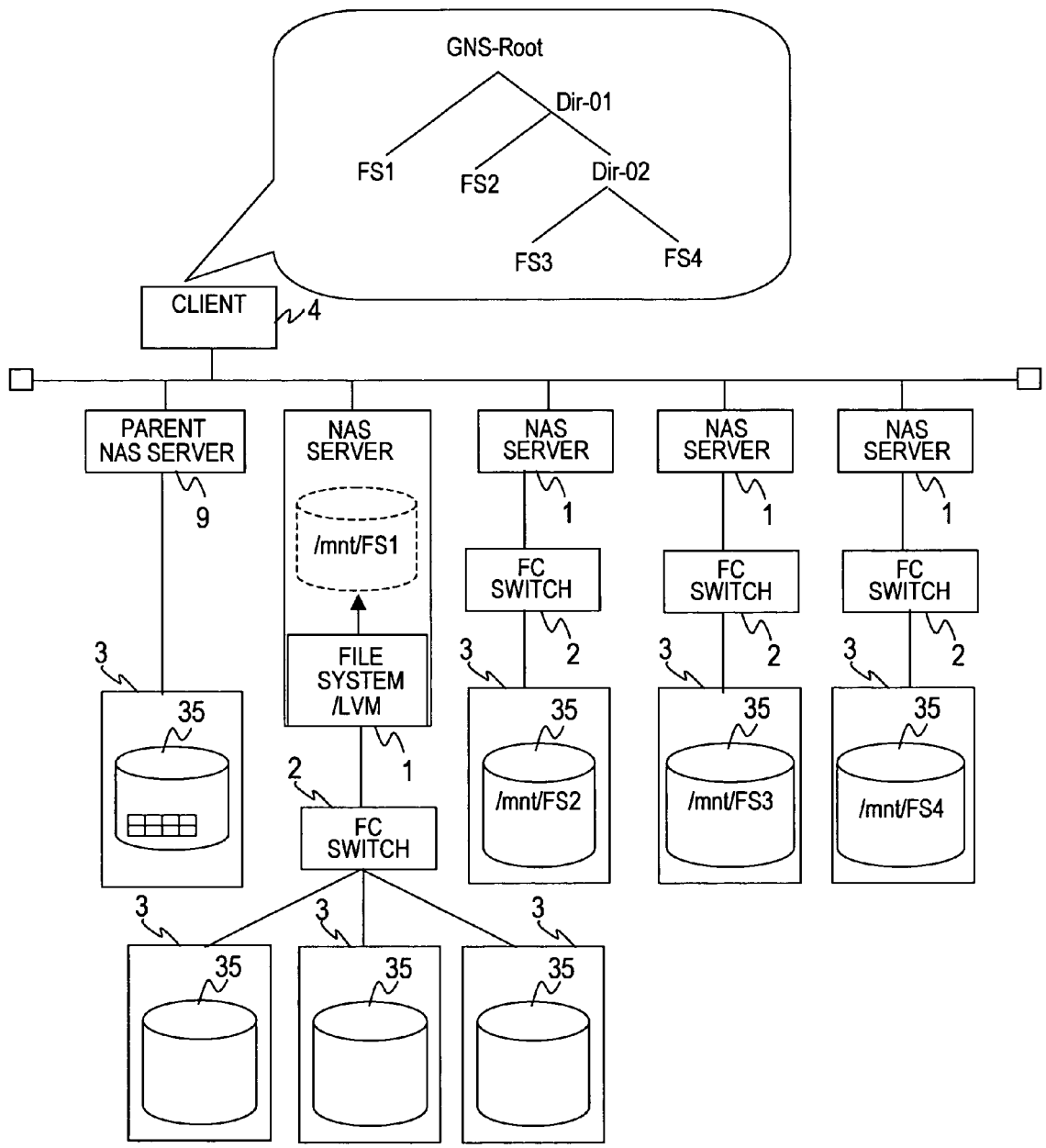
FIG. 10 is an explanatory diagram of the distributed storage mode C according to the embodiment of this invention.

FIG. 10 is an explanatory diagram of the distributed storage mode C according to the embodiment of this invention.

In the distributed storage mode C, one file is divided into sections and the file sections are stored in a plurality of disk subsystems 3 that are connected to the same NAS server 1.

The LVM 135 in the NAS server 1 provides a plurality of LUs 35 provided by a plurality of disk subsystems 3 to the file system 134 as one LU. In this manner, one file is divided and stored in a plurality of disk subsystems 3 that are connected to this NAS server 1.

FIG. 11 is an explanatory diagram of characteristics of the distributed storage modes A to C according to the embodiment of this invention.

The distributed storage mode A, which stores one file in one disk subsystem 3, is not suitable for storage of large-sized files since it allows access concentration on NAS where a large-sized file is stored.

On the other hand, the distributed storage mode A is suitable for storage of small-sized files since file distribution causes overhead when a small-sized file is distributed for storage among a plurality of disk subsystems 3.

The distributed storage mode B, which divides one file into sections to store the file sections in a plurality of NAS elements, is suitable for storage of large-sized files since access concentration on one NAS server 1 can be avoided.

On the other hand, the distributed storage mode B is not suitable for storage of small-sized files since file distribution causes overhead when a small-sized file is distributed for storage among a plurality of NAS elements.

In the distributed storage mode B, the granularity of file distribution can be changed. The distributed storage mode B is therefore suitable for storage of files that are frequently changed in size.

The distributed storage mode C, which divides one file into sections to store the file sections in a plurality of disk subsystems 3 that are connected to the same NAS server 1, is suitable for storage of large-sized files since access concentration on one disk subsystem 3 can be avoided.

In the distributed storage mode C, the granularity of file distribution cannot be changed. The distributed storage mode C is therefore not suitable for storage of files that are frequently changed in size.

One of the distributed storage modes A, B and C is applied to a file to take advantage of their respective characteristics.

FIG. 12 is an explanatory diagram of the distributed storage mode selection policy 138 according to the embodiment of this invention.

The NAS server 1 receives a write request from the parent NAS server 9 and requests the disk subsystem 3 to write data. At this point, the NAS server 1 judges based on the distributed storage mode selection policy 138 whether or not a distributed storage mode that is currently applied to a file in which data is requested to be written needs to be changed to another distributed storage mode.

Judging that a switch of distributed storage modes is necessary, the NAS server 1 sends a distributed storage mode change request to the parent NAS server 9. A distributed storage mode change request designates a distributed storage mode that is to be applied as a result of the switch.

The distributed storage mode selection policy 138 is set such that the respective characteristics of the distributed storage modes A to C are exploited. For instance, the distributed storage mode policy 138 dictates that the distributed storage mode A is applied to a file that has a file size less than a first threshold whereas the distributed storage mode B is applied to a file that has a file size equal to or more than the first threshold and a write frequency equal to or more than a second threshold, and the distributed storage mode C is applied to a file that has a file size equal to or more than the first threshold and a write frequency less than the second threshold.

The NAS server 1 therefore measures the write frequency of each file and stores a history of the measured write frequency.

FIG. 13 is a configuration diagram of the distributed storage mode management table 94 according to the embodiment of this invention.

The distributed storage mode management table 94 contains a NAS name 941, a currently adopted distributed storage mode 942, and an adoptable distributed storage mode 943.

The NAS name 941 indicates an identifier unique to each NAS server 1. The currently adopted distributed storage mode 942 indicates an identifier assigned to a distributed storage mode that is applied to a file currently managed by the file system 134 in the NAS server 1 that is identified by the NAS name 941 of the record entry in question. The adoptable distributed storage mode 943 indicates an identifier assigned to a distributed storage mode that is applied to a file manageable by the file system 134 in the NAS server 1 that is identified by the NAS name 941 of the record in question.

FIG. 14 is a configuration diagram of the distributed storage mode change management table 95 according to the embodiment of this invention.

The distributed storage mode change management table 95 contains a global path 951, a file name 952, and a next-applied distributed storage mode 953.

The global path 951 indicates a path that is used to identify the file system 134 in the NAS server 1 uniquely throughout the computer system. The file name 952 indicates an identifier unique to a file managed by the file system 134 that is identified by the global path 951 of the record entry in question.

The next-applied distributed storage mode 953 indicates an identifier unique to a distributed storage mode that is to be applied next to a file identified by the global path 951 and file name 952 of the record in question.

FIG. 15 is a configuration diagram of the distributed storage mode change history table 96 according to the embodiment of this invention.

The distributed storage mode change history table 96 contains a date/time 961, a file path 962, a pre-switch distributed storage mode 963, and a post-switch distributed storage mode 964.

The date/time 961 indicates a date and time when a switch is made for a file from one distributed storage mode to another. The file path 962 indicates a path that is used to identify, uniquely throughout the computer system, a file for which a switch of distributed storage modes is made at the date/time 961 of the record entry in question.

The pre-switch distributed storage mode 963 indicates an identifier assigned to a distributed storage mode that is applied before a switch of distributed storage modes is made to a file identified by the file path 962 of the record in question. The post-switch distributed storage mode 964 indicates an identifier assigned to a distributed storage mode that is applied after a switch of distributed storage modes is made to a file identified by the file path 962 of the record in question.

FIG. 16 is a configuration diagram of the distributed storage mode application state history table 97 according to the embodiment of this invention.

The distributed storage mode application state history table 97 contains a date/time 971, a distributed storage mode A application count 972, a distributed storage mode B application count 973, and a distributed storage mode C application count 974.

The date/time 971 indicates a date and time when a switch is made for a file from one distributed storage mode to another. The distributed storage mode A application count 972 indicates the count of files to which the distributed storage mode A is applied at the date/time 971 of the record entry in question. The distributed storage mode B application count 973 indicates the count of files to which the distributed storage mode B is applied at the date/time 971 of the record entry in question. The distributed storage mode C application count 974 indicates the count of files to which the distributed storage mode C is applied at the date/time 971 of the record entry in question.

Figure 17:
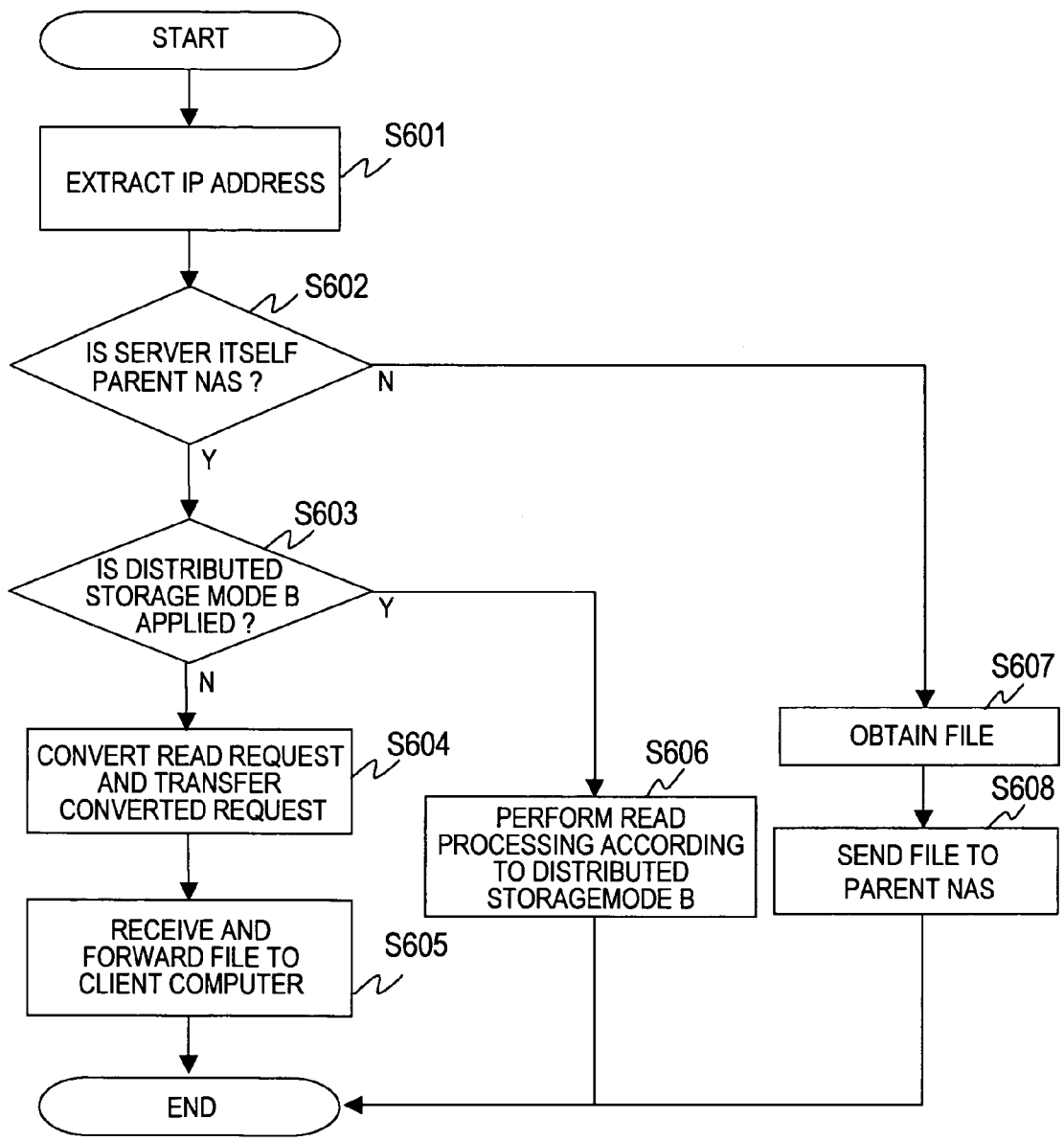
FIG. 17 is a flow chart for read processing that is executed by the NAS server and the parent NAS server according to the embodiment of this invention.

FIG. 17 is a flow chart for read processing that is executed by the NAS server 1 and the parent NAS server 9 according to the embodiment of this invention.

The NAS server 1 or the parent NAS server 9 executes this read processing upon receiving a read request. First, the NAS server 1 or the parent NAS server 9 extracts a source IP address from the received read request (S601). Next, the NAS server 1 or the parent NAS server 9 judges from the extracted source IP address whether itself is the parent NAS server 9 or not (S602).

The parent NAS server 9 receives a read request that contains, as a source IP address, an IP address that is not assigned to any of the parent NAS server 9 and the NAS servers 1. Each NAS server 1 receives a read request that contains, as a source IP address, an IP address that is assigned to the parent NAS server 9.

Judging itself as the parent NAS server 9, the server proceeds to Step S603. In short, the parent NAS server 9 proceeds to Step S603. Judging that the parent NAS server 9 is one of other servers than itself, the server proceeds to Step S607. In short, the NAS server 1 proceeds to Step S607.

The parent NAS server 9 extracts an access destination global path from the received read request. The parent NAS server 9 chooses from the GNS definition table 91 a record entry whose global path 911 matches a portion of the extracted global path. From the chosen record, the parent NAS server 9 extracts the NAS name 912 and the local path 913.

The parent NAS server 9 judges from the extracted NAS name 912 whether or not the distributed storage mode B is currently applied to a file that is requested by the received read request to be read (a read target file) (S603). When there is no identifier stored as the extracted NAS name 912, it means that the distributed storage mode B is currently applied to the read target file. When there is an identifier stored as the extracted NAS name 912, it means that the distributed storage mode B is not applied to the read target file at present.

In the case where the distributed storage mode B is currently applied to the read target file, the parent NAS server 9 executes read processing that is according to the distributed storage mode B (S606). The read processing according to the distributed storage mode B will be described in detail with reference to FIG. 18.

In the case where the distributed storage mode B is not applied to the read target file at present, the parent NAS server 9 converts a portion of the global path in the received read request into the extracted local path 913. The parent NAS server 9 sends the converted read request to the NAS server 1 that is identified by the extracted NAS name 912 (S604).

Next, the parent NAS server 9 stands by until a file is received from the NAS server 1. Receiving the file from the NAS server 1, the parent NAS server 9 sends the received file to the client computer 4 that is the sender of the read request (S605). The parent NAS server 9 then ends this read processing.

The NAS server 1, on the other hand, obtains from the disk subsystem 3 a file that is identified by a local path contained in the received read request (S607). The NAS server 1 sends the obtained file to the parent NAS server 9 (S608). The NAS server 1 then ends this read processing.

Figure 18:
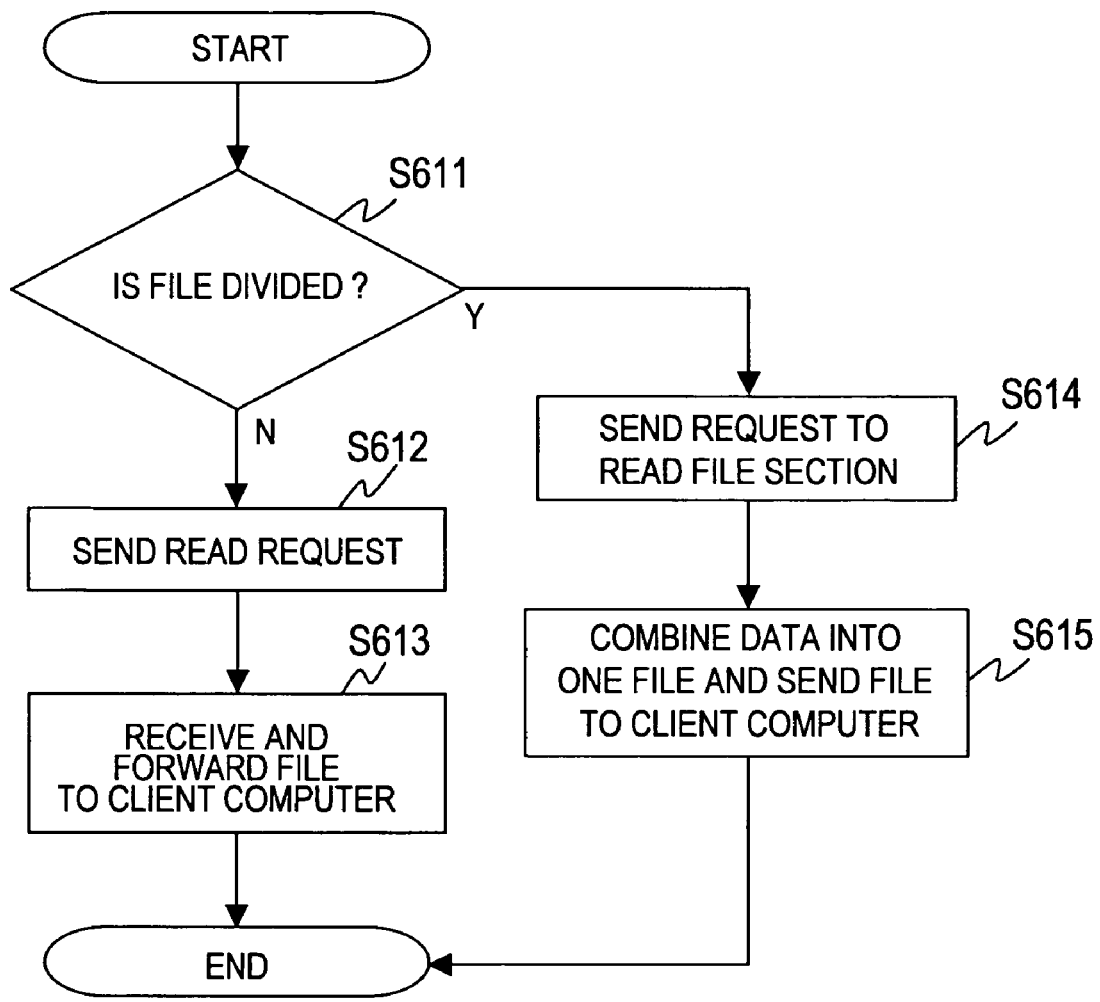
FIG. 18 is a flow chart for read processing that is according to the distributed storage mode B and executed by the parent NAS server according to the embodiment of this invention.

FIG. 18 is a flow chart for read processing that is according to the distributed storage mode B and executed by the parent NAS server 9 according to the embodiment of this invention.

The read processing according to the distributed storage mode B is executed in Step S606 of the read processing that is shown in FIG. 17.

First, the parent NAS server 9 judges whether or not the file section management table 93 has a record entry whose local path 931 matches the local path 913 extracted in Step S603 of the read processing that is shown in FIG. 17. The parent NAS server 9 thus judges whether or not the read target file is divided into sections (S611).

In the case where the file section management table 93 does not have a record whose local path matches the extracted local path, it means that the read target file is not divided. In the case where the file section management table 93 has a record whose local path matches the extracted local path, it means that the read target file is divided.

When the read target file is not divided, the parent NAS server 9 converts a portion of the global path in the received read request into the extracted local path 913. The parent NAS server 9 sends the converted read request to the NAS server 1 (S612).

Next, the parent NAS server 9 stands by until a file is received from the NAS server 1. Receiving the file from the NAS server 1, the parent NAS server 9 sends the received file to the client computer 4 that is the sender of the read request (S613). The parent NAS server 9 then ends this read processing according to the distributed storage mode B.

When the read target file is divided, on the other hand, the parent NAS server 9 selects from the file section management table 93 every record entry whose local path 931 matches the local path 913 extracted in Step S603 of the read processing that is shown in FIG. 17.

The parent NAS server 9 identifies the selected records in turn. From the identified record, the parent NAS server 9 extracts the NAS name 932 and the file section path 933. Next, the parent NAS server 9 converts the global path contained in the received read request into the extracted file section path 933. The parent NAS server 9 sends the converted read request to the NAS server 1 that is identified by the extracted NAS name 932.

The parent NAS server 9 repeats the processing until every record selected from the file section management table 93 is identified. In this manner, the parent NAS server 9 sends the read request to every NAS that stores a section of the read target file (file section).

Next, the parent NAS server 9 stands by until a file section is received from every NAS server 1 to which the read request has been sent. Receiving a file section from every NAS server 1 to which the read request has been sent, the parent NAS server 9 combines the received file sections to thereby create the read target file. The parent NAS server 9 sends the created file to the client computer 4 that is the sender of the read request (S615). The parent NAS server 9 then ends this read processing according to the distributed storage mode B.

Figure 19:
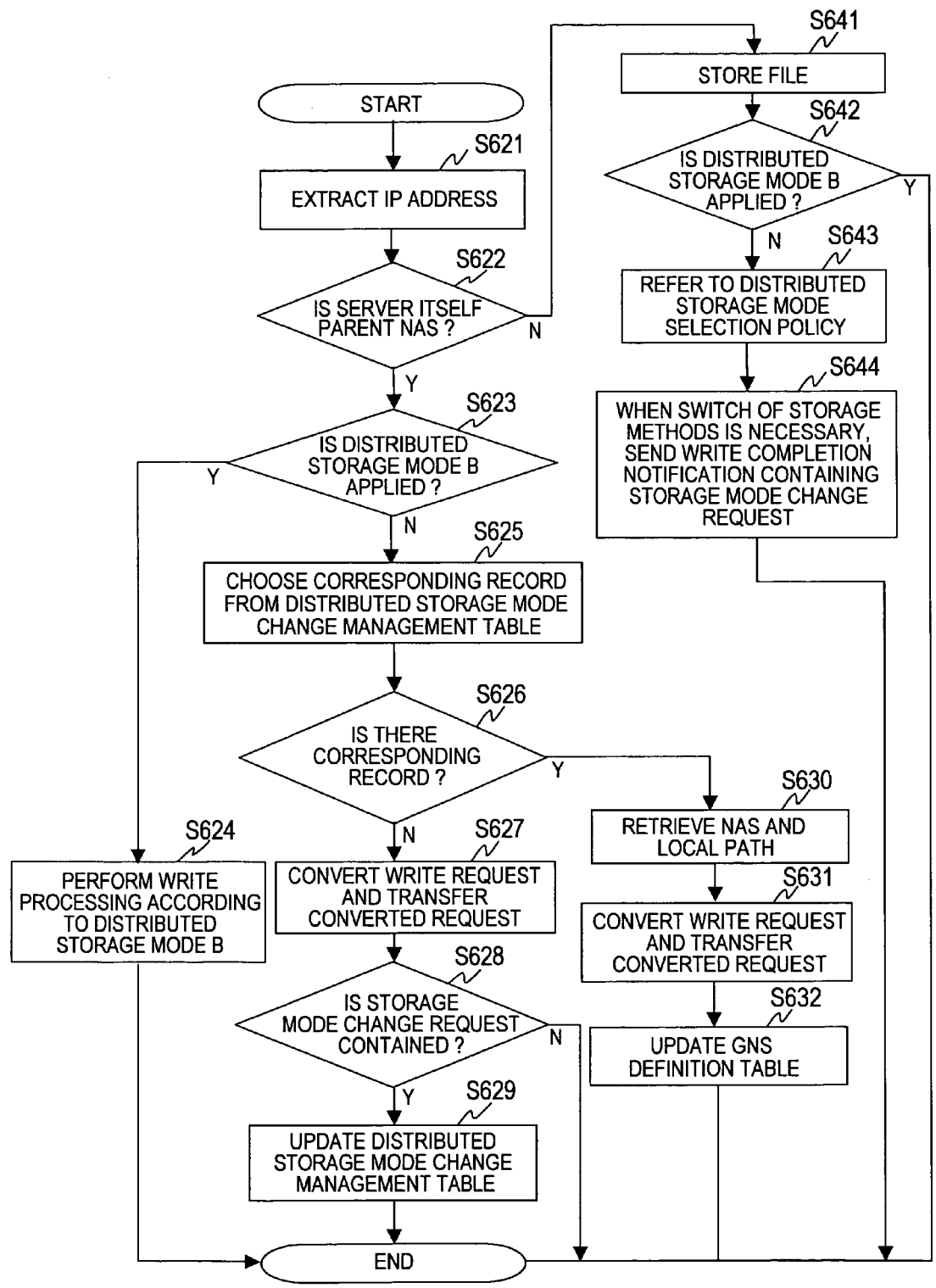
FIG. 19 is a flow chart for write processing that is executed by the NAS server and the parent NAS server according to the embodiment of this invention.

FIG. 19 is a flow chart for write processing that is executed by the NAS server 1 and the parent NAS server 9 according to the embodiment of this invention.

The NAS server 1 or the parent NAS server 9 executes this write processing upon receiving a write request. First, the NAS server 1 or the parent NAS server 9 extracts a source IP address from the received write request (S621). Next, the NAS server 1 or the parent NAS server 9 judges from the extracted source IP address whether itself is the parent NAS server 9 or not (S622).

The parent NAS server 9 receives a write request that contains, as a source IP address, an IP address that is not assigned to any of the parent NAS server 9 and the NAS servers 1. Each NAS server 1 receives a write request that contains, as a source IP address, an IP address that is assigned to the parent NAS server 9.

Judging itself as the parent NAS server 9, the server proceeds to Step S623. In short, the parent NAS server 9 proceeds to Step S623. Judging that the parent NAS server 9 is one of other servers than itself, the server proceeds to Step S641. In short, the NAS server 1 proceeds to Step S641.

The parent NAS server 9 extracts an access destination global path from the received write request. The parent NAS server 9 chooses from the GNS definition table 91 a record entry whose global path 911 matches a portion of the extracted global path. From the chosen record, the parent NAS server 9 extracts the NAS name 912 and the local path 913.

The parent NAS server 9 judges from the extracted NAS name 912 whether or not the distributed storage mode B is currently applied to a file that is requested by the received write request to be written (a write target file) (S623). When there is no identifier stored as the extracted NAS name 912, it means that the distributed storage mode B is currently applied to the write target file. When there is an identifier stored as the extracted NAS name 912, it means that the distributed storage mode B is not applied to the write target file at present.

In the case where the distributed storage mode B is currently applied to the write target file, the parent NAS server 9 executes write processing according to the distributed storage mode B (S624). The write processing according to the distributed storage mode B will be described in detail with reference to FIG. 21.

In the case where the distributed storage mode B is not applied to the write target file at present, the parent NAS server 9 judges whether or not the distributed storage mode change management table 95 has a record entry whose combination of the global path 951 and the file name 952 matches the extracted global path (S625 and S626).

When such a record is not found in the distributed storage mode change management table 95, it means that a distributed storage mode that is currently applied to the write target file does not need to be replaced. Then the parent NAS server 9 converts a portion of the global path in the received write request into the local path 913 extracted in Step S623. The parent NAS server 9 sends the converted write request to the NAS server 1 that is identified by the NAS name 912 extracted in Step S623 (S627).

Next, the parent NAS server 9 stands by until a write completion notification is received from the NAS server 1. Receiving a write completion notification from the NAS server 1, the parent NAS server 9 sends a response to the received write request to the client computer 4.

The parent NAS server 9 next judges whether or not the received write completion notification contains a distributed storage mode change request (S628). A distributed storage mode change request designates a distributed storage mode that is to be applied as a result of a switch of distributed storage modes.

In the case where the write completion notification does not contain a distributed storage mode change request, it means that the NAS server 1 is not requesting the parent NAS server 9 to change the distributed storage mode that is currently applied to the write target file to another distributed storage mode. The parent NAS server 9 accordingly ends this write processing at this point.

In the case where the write completion notification contains a storage mode change request, it means that the NAS server 1 is requesting the parent NAS server 9 to change the distributed storage mode that is currently applied to the write target file to another distributed storage mode.

Then the parent NAS server 9 updates the distributed storage mode change management table 95 (S629). Specifically, the parent NAS server 9 creates a new record entry in the distributed storage mode change management table 95. The parent NAS server 9 stores a portion of the global path extracted from the received write request other than the file name as the global path 951 of the new record. As the file name 952 of the new record, the parent NAS server 9 stores the file name in the global path extracted from the received write request. As the next-applied distributed storage mode 953 of the new record, the parent NAS server 9 stores the identifier of the distributed storage mode that is designated in the received storage mode change request.

The parent NAS server 9 thus updates the distributed storage mode change management table 95. This enables the parent NAS server 9 to change the distributed storage mode that is currently applied to the file for which a distributed storage mode change has been requested to another distributed storage mode when a write request for this file is received next time. The parent NAS server 9 then ends this write processing.

In the case where a record entry that meets the search criterion is found in the distributed storage mode change management table 95 in Step S626, the parent NAS server 9 needs to change the distributed storage mode that is currently applied to the write target file to another distributed storage mode.

The parent NAS server 9 in this case picks up the found record from the distributed storage mode change management table 95. From the picked up record, the parent NAS server 9 extracts the next-applied distributed storage mode 953. The parent NAS server 9 next chooses from the distributed storage mode management table 94 a record entry whose adoptable distributed storage mode 943 matches the extracted next-applied distributed storage mode 953. In the case where a plurality of records in the distributed storage mode management table 94 meet this condition, the parent NAS server 9 chooses one out of these records by any appropriate method.

From the chosen record, the parent NAS server 9 extracts the NAS name 941. The parent NAS server 9 next chooses a record entry of the GNS definition table 91 that has the NAS name 912 matching the extracted NAS name 941. From the chosen record, the parent NAS server 9 extracts the local path 913 (S630).

The parent NAS server 9 then judges whether or not "B" is stored as the extracted next-applied distributed storage mode 953.

In the case where "B" is not stored as the next-applied distributed storage mode 953, the parent NAS server 9 converts the portion of the global path in the received write request into the extracted local path 913. The parent NAS server 9 sends the converted write request to the NAS server 1 that is identified by the extracted NAS name 941 (S631).

Next, the parent NAS server 9 stands by until a write completion notification is received from the NAS server 1. Receiving a write completion notification from the NAS server 1, the parent NAS server 9 sends a response to the received write request to the client computer 4.

In the case where "B" is stored as the next-applied distributed storage mode 953, on the other hand, the parent NAS server 9 chooses from the file division policy 92 a record entry whose size 921 matches the size of the write target file. From the chosen record, the parent NAS server 9 extracts the section count 922.

The parent NAS server 9 then divides the write target file into as many sections as indicated by the extracted section count 922. The parent NAS server 9 thus divides one write target file into a plurality of file sections.

Next, the parent NAS server 9 sets a file section path for identifying a storage area in which a file section is stored.

The parent NAS server 9 sends to the NAS server 1 a write request that requests to store a file section in the storage area identified by the set file section path (S631). The parent NAS server 9 also updates the file section management table 93.

Specifically, the parent NAS server 9 creates a new record entry in the file section management table 93. The parent NAS server 9 stores the local path 913 extracted in Step S623 of the write processing as the local path 931 of the new record. As the NAS name 932 of the new record, the parent NAS server 9 stores the identifier of the NAS server 1 that manages a file section identified by the set file section path. As the file section path 933 of the new record, the parent NAS server 9 stores the set file section path.

After sending the write request, the parent NAS server 9 stands by until a write completion notification is received from every NAS server 1 to which the write request has been sent. Receiving a write completion notification from every NAS server 1 to which the write request has been sent, the parent NAS server 9 sends a response to the received write request to the client computer 4.

The parent NAS server 9 next updates the GNS definition table 91 (S632). Specifically, the parent NAS server 9 chooses from the GNS definition table 91 a record entry whose global path 911 matches a portion of the global path extracted from the received write request other than the file name. The parent NAS server 9 stores the extracted NAS name 941 as the NAS name 912 of the chosen record. However, in the case where "B" is stored as the next-applied distributed storage mode 953, the parent NAS server 9 stores no value as the NAS name 912 of the chosen record. As the local path 913 of the chosen record, the parent NAS server 9 stores the extracted local path 913.

The parent NAS server 9 thus finishes changing the distributed storage mode that is currently applied to the write target file to another distributed storage mode.

Next, the parent NAS server 9 updates the distributed storage mode change history table 96. Specifically, the parent NAS server 9 adds a new record entry to the distributed storage mode change history table 96.

The parent NAS server 9 stores the current date and time as the date/time 961 of the new record. As the file path 962 of the new record, the parent NAS server 9 stores the global path extracted from the received write request. As the pre-switch distributed storage mode 963 of the new record, the parent NAS server 9 stores the identifier of the distributed storage mode that has been applied to a file that is identified by the global path extracted from the received write request. As the post-switch distributed storage mode 964 of the new record, the parent NAS server 9 stores the next-applied distributed storage mode 953 extracted.

The parent NAS server 9 updates the distributed storage mode change history table 96 in the manner described above.

The parent NAS server 9 next updates the distributed storage mode application state history table 97. Specifically, the parent NAS server 9 obtains the count of files to which the distributed storage mode A is currently applied, the count of files to which the distributed storage mode B is currently applied, and the count of files to which the distributed storage mode C is currently applied.

The parent NAS server 9 then adds a new record entry to the distributed storage mode application state history table 97. The parent NAS server 9 stores the current date and time as the date/time 971 of the new record.

As the distributed storage mode A application count 972 of the new record, the parent NAS server 9 stores the obtained count of files to which the distributed storage mode A is currently applied. As the distributed storage mode B application count 973 of the new record, the parent NAS server 9 stores the obtained count of files to which the distributed storage mode B is currently applied. As the distributed storage mode C application count 974 of the new record, the parent NAS server 9 stores the obtained count of files to which the distributed storage mode C is currently applied.

The parent NAS server 9 updates the distributed storage mode application state history table 97 in the manner described above.

The parent NAS server 9 may send a distributed storage mode change notification to the management computer 5. Receiving the distributed storage mode change notification, the management computer 5 displays a distributed storage mode change notification screen shown in FIG. 20.

The parent NAS server 9 then ends this write processing.

FIG. 20 is an explanatory diagram of the distributed storage mode change notification screen which is displayed by the management computer 5 according to the embodiment of this invention.

The distributed storage mode change notification screen informs that a distributed storage mode applied to a file has been switched to another distributed storage mode.

The description returns to FIG. 19.

Processing that is performed when the server judges in Step S622 that one of other servers than itself is the parent NAS server 9 will now be described. The NAS server 1 stores, in the disk subsystem 3, a file that is contained in the received write request (S641). The NAS server 1 next judges whether or not the distributed storage mode B is currently applied to the stored file (S642).

In the case where the distributed storage mode B is currently applied to the stored file, the NAS server 1 sends a write completion notification to the parent NAS server 9, and then ends this write processing.

In the case where the distributed storage mode B is not applied to the stored file at present, the NAS server 1 identifies from the distributed storage mode selection policy 138 which distributed storage mode is to be applied to the stored file (S643). The NAS server 1 compares the identified distributed storage mode against a distributed storage mode that is currently applied to this file, to thereby judge whether or not the distributed storage mode currently applied to the file needs to be changed to another distributed storage mode.

When a switch of distributed storage modes is not necessary, the NAS server 1 sends a write completion notification to the parent NAS server 9, and then ends this write processing.

When a switch of distributed storage modes is necessary, the NAS server 1 sends a write completion notification that contains a storage mode change request to the parent NAS server 9 (S644). A storage mode change request designates a distributed storage mode that is to be applied after a switch of distributed storage modes. The NAS server 1 then ends this write processing.

Figure 21:
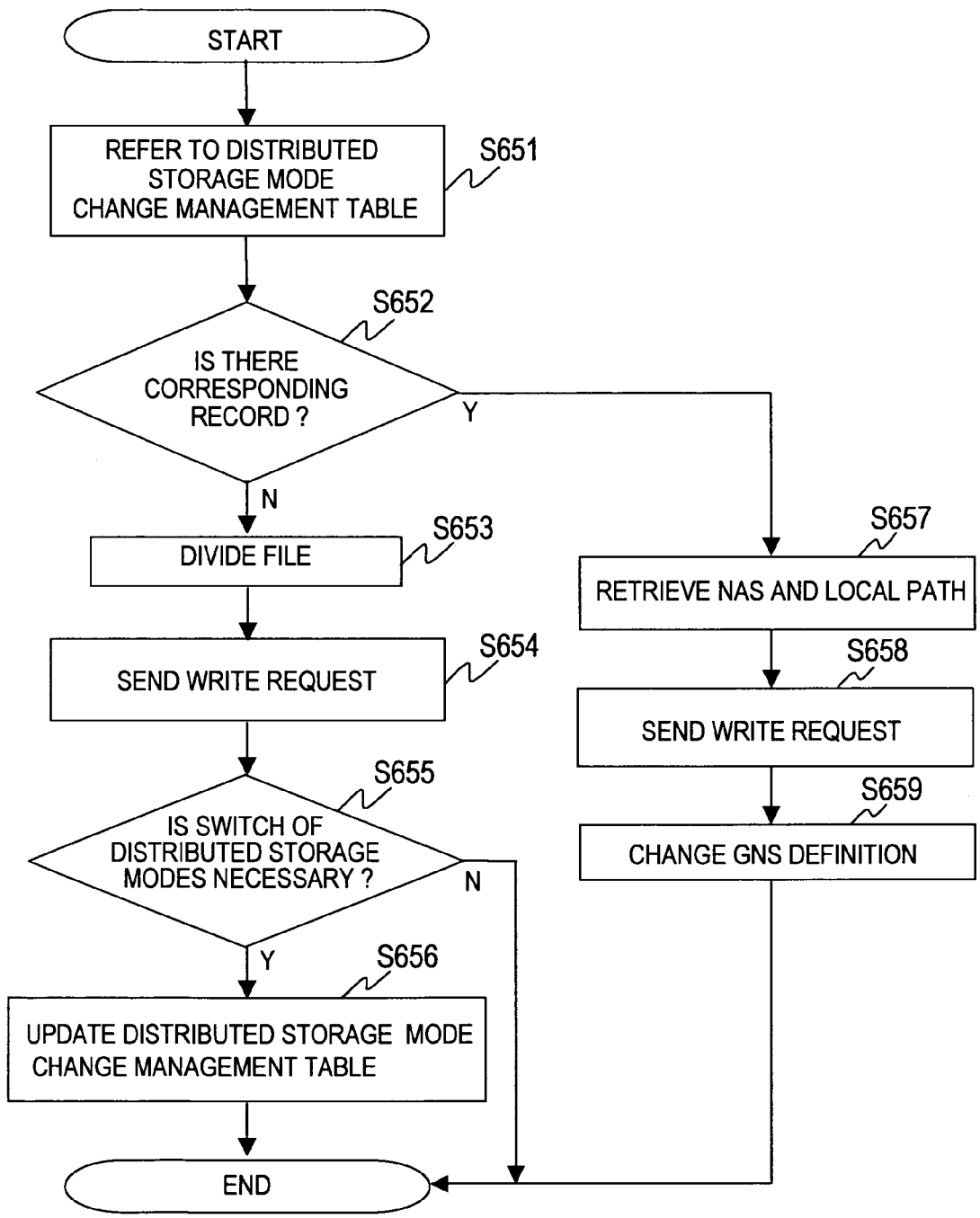
FIG. 21 is a flow chart for write processing that is according to the distributed storage mode B and executed by the parent NAS server according to the embodiment of this invention.

FIG. 21 is a flow chart for write processing that is according to the distributed storage mode B and executed by the parent NAS server 9 according to the embodiment of this invention.

The write processing according to the distributed storage mode B is executed in Step S624 of the write processing that is shown in FIG. 19.

First, the parent NAS server 9 judges whether or not the distributed storage mode change management table 95 has a record entry whose combination of the global path 951 and the file name 952 matches the global path extracted in Step S623 (S651 and S652).

When such a record is not found in the distributed storage mode change management table 95, it means that a distributed storage mode that is currently applied to the write target file does not need to be replaced. Then the parent NAS server 9 chooses from the file division policy 92 a record entry whose size 921 matches the size of the write target file. From the chosen record, the parent NAS server 9 extracts the section count 922.

The parent NAS server 9 then divides the write target file into as many sections as indicated by the extracted section count 922 (S653). The parent NAS server 9 thus divides one write target file into a plurality of file sections.

Next, the parent NAS server 9 selects from the file section management table 93 every record entry whose local path 931 matches the local path 913 extracted in Step S623 of the write processing that is shown in FIG. 19.

The parent NAS server 9 identifies the selected records one at a time. From the identified record, the parent NAS server 9 extracts the NAS name 932 and the file section path 933. Next, the parent NAS server 9 sends, to the NAS server 1 that is identified by the extracted NAS name 932, a write request that requests to store a file section in a storage area that is identified by the extracted file section path 933 (S654).

The parent NAS server 9 repeats the processing until every record selected from the file section management table 93 is identified. In this manner, the parent NAS server 9 sends write requests each containing one file section to different NAS elements.

In the case where the file section management table 93 does not have a record entry whose local path 931 matches the extracted local path 913, the parent NAS server 9 sets a file section path for identifying a storage area in which a file section is stored.

The parent NAS server 9 sends to the NAS server 1 a write request that requests to store a file section in the storage area identified by the set file section path.

The parent NAS server 9 also updates the file section management table 93.

Specifically, the parent NAS server 9 creates a new record entry in the file section management table 93. The parent NAS server 9 stores the local path 913 extracted in Step S623 of the write processing as the local path 931 of the new record. As the NAS name 932 of the new record, the parent NAS server 9 stores the identifier of the NAS server 1 that manages a file section identified by the set file section path. As the file section path 933 of the new record, the parent NAS server 9 stores the set file section path.

After sending the write request, the parent NAS server 9 stands by until a write completion notification is received from every NAS server 1 to which the write request has been sent. Receiving a write completion notification from every NAS server 1 to which the write request has been sent, the parent NAS server 9 sends a response to the received write request to the client computer 4.

Next, the parent NAS server 9 identifies from the distributed storage mode selection policy 138 which distributed storage mode is to be applied to the write target file. The parent NAS server 9 compares the identified distributed storage mode against a distributed storage mode that is currently applied to this file, to thereby judge whether or not the distributed storage mode currently applied to the file needs to be changed to another distributed storage mode (S655).

When a switch of distributed storage modes is not necessary, the parent NAS server 9 ends this write processing at this point.

When a switch of distributed storage modes is necessary, the parent NAS server 9 updates the distributed storage mode management table 95 (S656).

Specifically, the parent NAS server 9 creates a new record entry in the distributed storage mode change management table 95. The parent NAS server 9 stores a portion of the global path extracted from the received write request other than the file name as the global path 951 of the new record. As the file name 952 of the new record, the parent NAS server 9 stores the file name in the global path extracted from the received write request. As the next-applied distributed storage mode 953 of the new record, the parent NAS server 9 stores the identifier of the identified distributed storage mode.

The parent NAS server 9 thus updates the distributed storage mode change management table 95. This enables the parent NAS server 9 to change the distributed storage mode that is currently applied to the file for which a distributed storage mode change is necessary to another distributed storage mode when a write request for this file is received next time. The parent NAS server 9 then ends this write processing.

In the case where a record entry that meets the search criterion is found in the distributed storage mode change management table 95 in Step S652, the parent NAS server 9 needs to change the distributed storage mode that is currently applied to the write target file to another distributed storage mode. In this example, the parent NAS server 9 makes a switch from the distributed storage mode B to the distributed storage mode A or the distributed storage mode C.

The parent NAS server 9 in this case picks up the found record from the distributed storage mode change management table 95. From the picked up record, the parent NAS server 9 extracts the next-applied distributed storage mode 953. The parent NAS server 9 next chooses from the distributed storage mode management table 94 a record entry whose adoptable distributed storage mode 943 matches the extracted next-applied distributed storage mode 953. In the case where a plurality of records in the distributed storage mode management table 94 meet this condition, the parent NAS server 9 chooses one out of these records by any appropriate method.

From the chosen record, the parent NAS server 9 extracts the NAS name 941. The parent NAS server 9 next chooses a record entry of the GNS definition table 91 that has the NAS name 912 matching the extracted NAS name 941. From the chosen record, the parent NAS server 9 extracts the local path 913 (S657).

The parent NAS server 9 converts a portion of the global path in the received write request into the extracted local path 913. The parent NAS server 9 sends the converted write request to the NAS server 1 that is identified by the extracted NAS name 941 (S658).

Next, the parent NAS server 9 stands by until a write completion notification is received from the NAS server 1. Receiving a write completion notification from the NAS server 1, the parent NAS server 9 sends a response to the received write request to the client computer 4.

The parent NAS server 9 subsequently updates the GNS definition table 91 (S659). Specifically, the parent NAS server 9 chooses from the GNS definition table 91 a record entry whose global path 911 matches a portion of the global path extracted from the received write request other than the file name. The parent NAS server 9 stores the extracted NAS name 941 as the NAS name 912 of the chosen record. As the local path 913 of the chosen record, the parent NAS server 9 stores the extracted local path 913.

The parent NAS server 9 thus finishes changing the distributed storage mode that is currently applied to the write target file to another distributed storage mode.

Next, the parent NAS server 9 updates the distributed storage mode change history table 96. The parent NAS server 9 also updates the distributed storage mode application state history table 97.

The parent NAS server 9 may notify the management computer 5 of a switch between distributed storage modes. Notified of a switch between distributed storage modes, the management computer 5 displays the distributed storage mode change notification screen shown in FIG. 20.

The parent NAS server 9 then ends this write processing.

Figure 22:
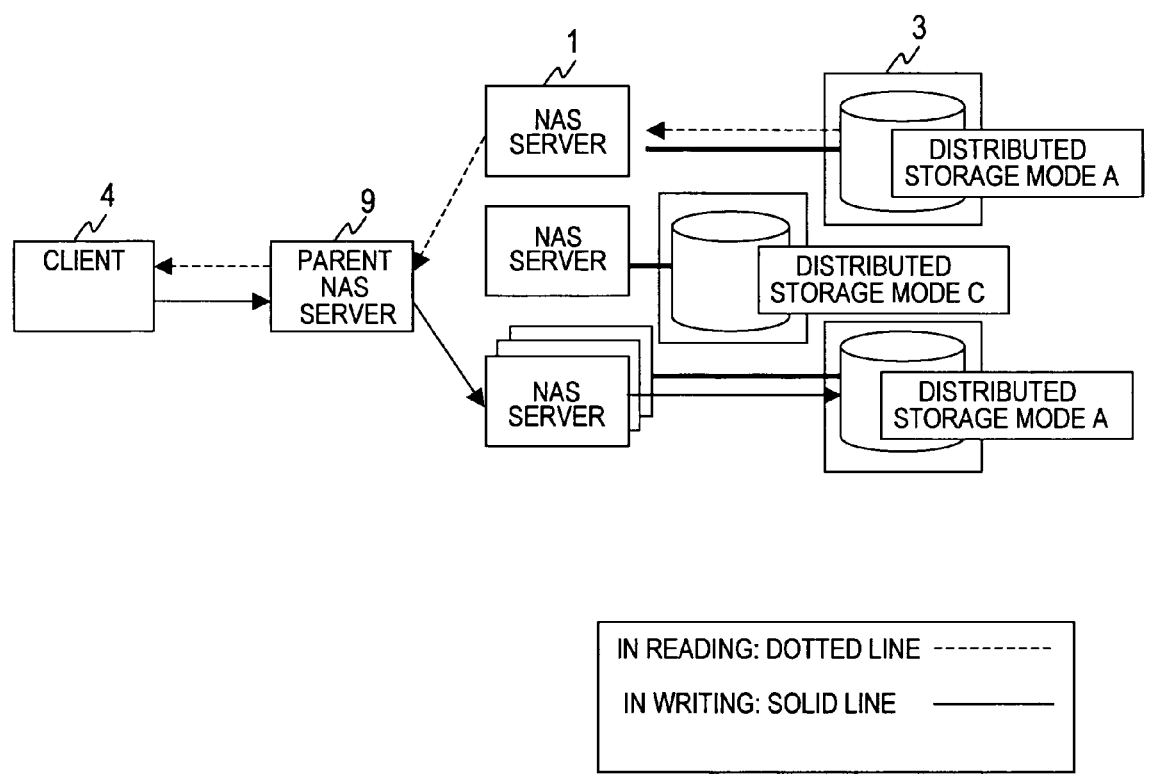
FIG. 22 is an explanatory diagram of file migration according to the embodiment of this invention.

FIG. 22 is an explanatory diagram of file migration according to the embodiment of this invention.

In this explanatory diagram, the flow of a file in read processing is indicated by a dotted line whereas the flow of a file in write processing is indicated by a solid line.

The parent NAS server 9 receives a read request from the client computer 4. The parent NAS server 9 transfers the read request to NAS that stores a read target file. The parent NAS server 9 thus receives the read target file from the NAS, and transfers the received file to the client computer 4.

The parent NAS server 9 receives a write request from the client computer 4, and judges whether or not a distributed storage mode that is currently applied to a write target file needs to be changed to another distributed storage mode.

When a switch of distributed storage modes is not necessary, the parent NAS server 9 transfers the write request to the NAS that stores the write target file.

When a switch of distributed storage modes is necessary, the parent NAS server 9 sends a write request containing a part of or the entirety of the write target file to NAS where a post-switch distributed storage mode is adopted. The parent NAS server 9 thus changes the location at which a file is stored. In other words, the parent NAS server 9 can make the write target file migrate without copying. The parent NAS server 9 is also capable of changing the distributed storage mode to be applied to a file.

Described next is addition of a file system or the NAS server 1 that adopts a specific distributed storage mode.

The parent NAS server 9 automatically adds a file system that adopts a necessary distributed storage mode when prompted by a given trigger event.

For instance, when the distributed storage mode management table 94 does not have a record entry whose adoptable distributed storage mode 943 matches the next-applied distributed storage mode 953 in Step S630 of the write processing, the parent NAS server 9 automatically adds a file system that adopts a necessary distributed storage mode.

To give another example, when the rate of increase in number of files to which a specific distributed storage mode is applied exceeds a given value, the parent NAS server 9 automatically adds a file system that adopts this distributed storage mode. The parent NAS server 9 calculates the rate of increase in number of files to which a specific distributed storage mode is applied based on the distributed storage mode application state history table 97.

After automatic addition of a file system, the parent NAS server 9 sends a GNS environment change notification to the management computer 5. Receiving the GNS environment change notification, the management computer 5 displays a GNS environment change notification screen shown in FIG. 23.

FIG. 23 is an explanatory diagram of the GNS environment change notification screen which is displayed by the management computer 5 according to the embodiment of this invention.

The GNS environment change notification screen informs that a file system that adopts a specific distributed storage mode has been added.

Instead of automatically adding a file system, the parent NAS server 9 may request an administrator to add a file system or NAS that adopts a necessary distributed storage mode. The parent NAS server 9 in this case sends a GNS environment change request to the management computer 5. Receiving the GNS environment change request, the management computer 5 displays a GNS environment change request screen shown in FIG. 24.

FIG. 24 is an explanatory diagram of the GNS environment change request screen which is displayed by the management computer 5 according to the embodiment of this invention.

The GNS environment change request screen requests the administrator to add a file system that adopts a specific distributed storage mode. The administrator specifies a size and then instructs the management computer 5 to add this file system. The management computer 5 sends a file system addition request that contains the specified size to the parent NAS server 9. Receiving the file system addition request, the parent NAS server 9 adds the requested file system that adopts a specific distributed storage mode.

Described next is how to take a snapshot of a file to which the distributed storage mode B is applied. The usual method cannot be employed in taking a snapshot of a file to which the distributed storage mode B is applied, since employing the usual way of taking a snapshot for this file only yields a snapshot in which the file is partially updated by a write request.

To avoid this, the parent NAS server 9 takes a snapshot of a file to which the distributed storage mode B is applied by executing snapshot processing that is according to the distributed storage mode B.

Figure 25:
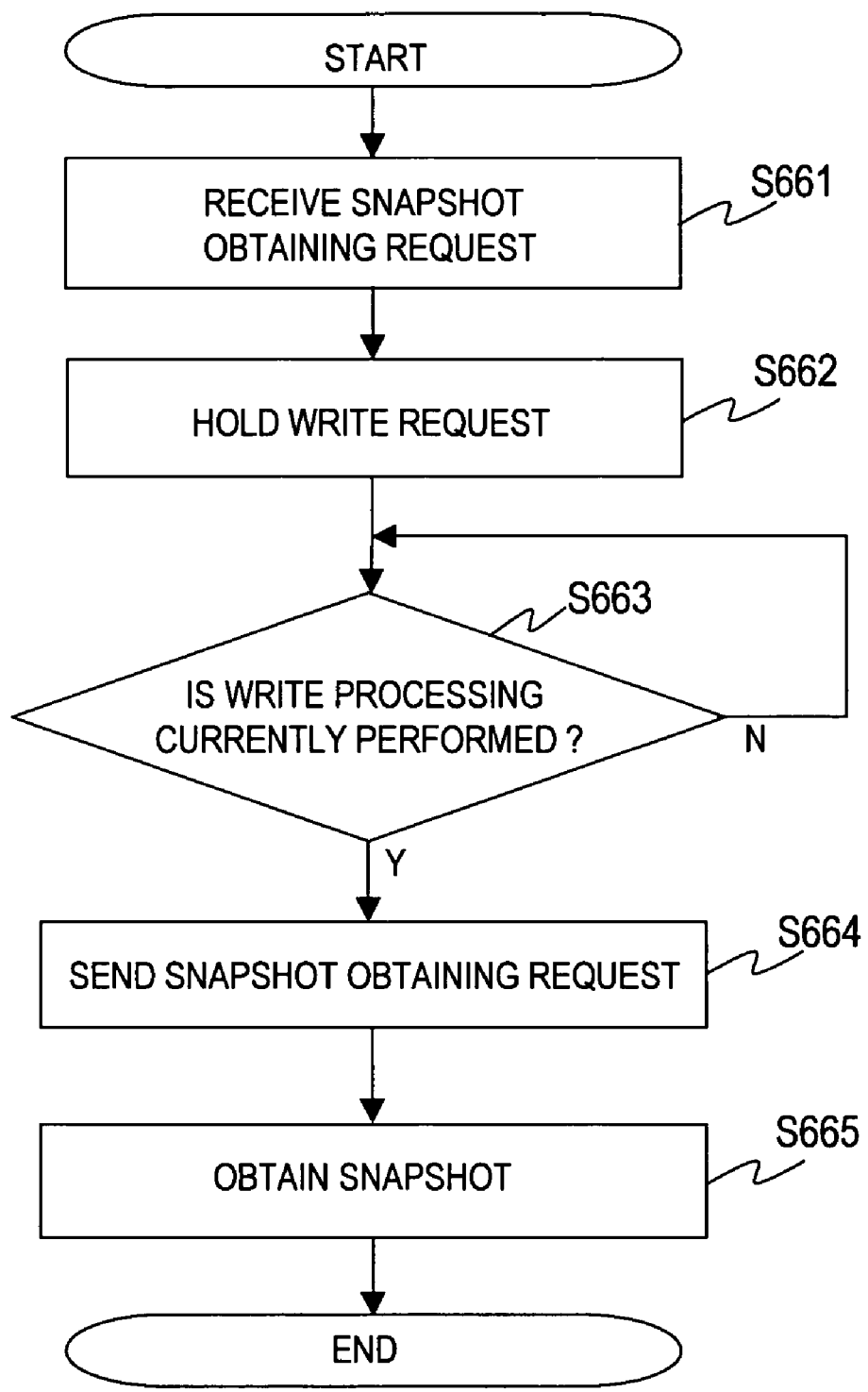
FIG. 25 is a flow chart for snapshot processing that is according to the distributed storage mode B and executed by the parent NAS server according to the embodiment of this invention.

FIG. 25 is a flow chart for snapshot processing that is according to the distributed storage mode B and executed by the parent NAS server 9 according to the embodiment of this invention.

First, the parent NAS server 9 receives a snapshot obtaining request from the management computer 5 or others (S661). The parent NAS server 9 stops transferring write requests to the NAS servers 1 altogether, in other words, temporarily holds received write requests (S662).

Next, the parent NAS server 9 makes an inquiry to every NAS server 1 that manages a file to which the distributed storage mode B is applied in order to find out whether the NAS server 1 is performing write processing or not (S663).

When even one NAS server 1 is performing write processing, it means that data update by a write request is not finished. Then the parent NAS server 9 waits until no NAS server 1 is performing write processing.

When no NAS server 1 is performing write processing, it means that data update by a write request is finished. Then the parent NAS server 9 sends a snapshot obtaining request to every NAS server 1 (S664). The parent NAS server 9 thus obtains a snapshot from the NAS server 1 (S665).

The parent NAS server 9 sends the obtained snapshot to the management computer 5 or other components that have sent the snapshot obtaining request. The parent NAS server 9 then ends the snapshot processing according to the distributed storage mode B.

A modification example of the distributed storage mode B will be described next.

Figure 26:
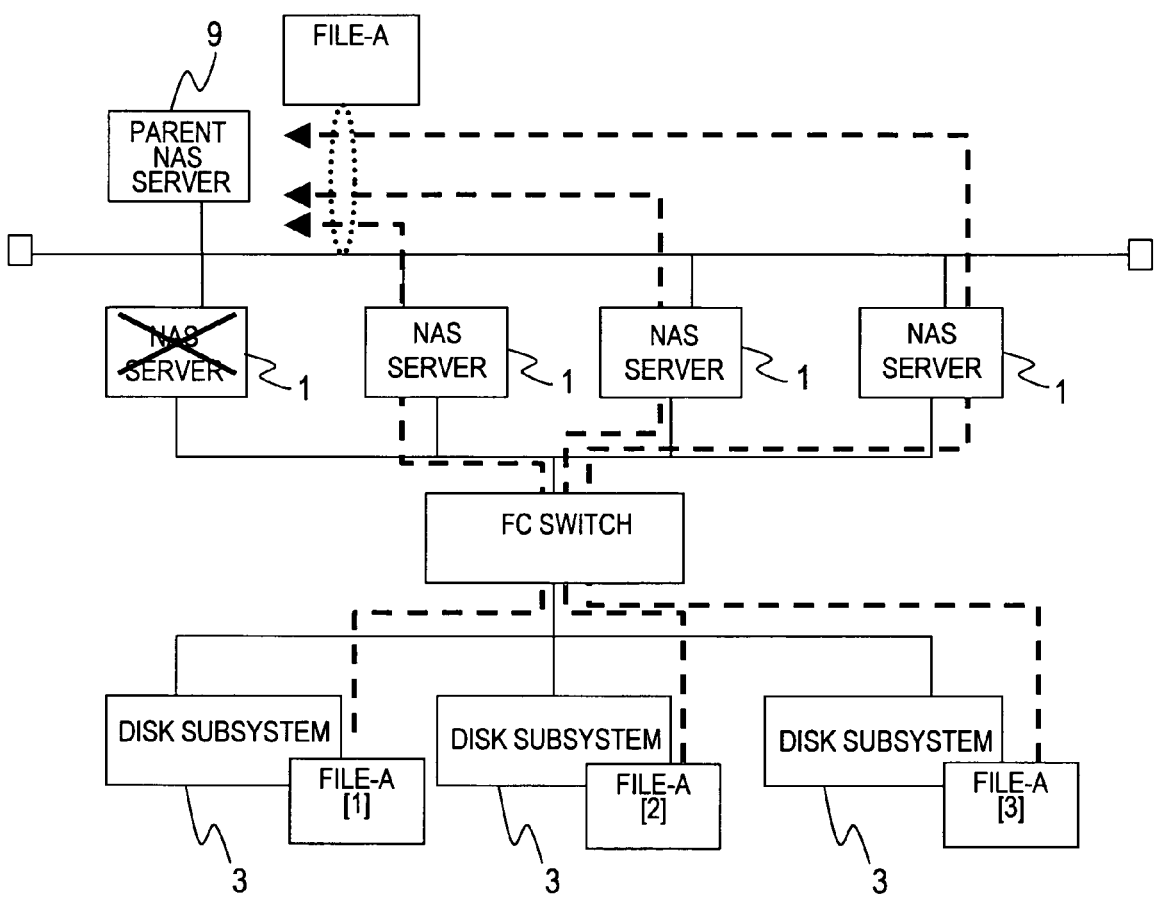
FIG. 26 is an explanatory diagram of a modification example of the distributed storage mode B according to the embodiment of this invention.

FIG. 26 is an explanatory diagram of a modification example of the distributed storage mode B according to the embodiment of this invention.

In the distributed storage mode B where one file is divided into a plurality of sections to store the file sections in a plurality of NAS elements, the client computer 4 cannot access the file when a failure occurs in even one of the NAS servers 1 that manage the file sections.

The modification example of the distributed storage mode B solves this problem by applying a cluster file system to the distributed storage mode B. In the cluster file system, a plurality of NAS servers 1 share the disk subsystem 3. Four NAS servers 1 share three disk subsystems 3 in this explanatory diagram.

When a failure occurs in one of the NAS servers 1 that manage sections of a file, the cluster file system enables the rest of the NAS servers 1 which are not suffering from a failure to obtain file sections from the disk subsystem 3. The client computer 4 can therefore access the file despite a failure in the NAS server 1.

While the present invention has been described in detail and pictorially in the accompanying drawings, the present invention is not limited to such detail but covers various obvious modifications and equivalent arrangements, which fall within the purview of the appended claims.

What is claimed is:

1. A file storage method for a computer system having one first file server which is accessed by a client computer, a plurality of second file servers which are coupled to the first file server via a network, and a plurality of storage subsystems which are coupled to the second file servers, comprising:

applying to a first file, whose file size is less than a first threshold, stored in the storage subsystems a first file storage mode in which the first file is stored in one of the storage subsystems;

applying to a second file, whose file size is more the first threshold, stored in the storage subsystems, one of a second file storage mode in which the second file is stored in two or more of the storage subsystems that are coupled to different second file servers in a distributive manner, and a third file storage mode in which the second file is stored in two or more of the storage subsystems which are coupled to one of the second file servers in a distributive manner;

integrating, by the first server, directory structures that are unique throughout the respective second file servers to provide the integrated directory structures as a directory structure that is unique throughout the computer system to the client computer;

analyzing, by at least one of the first file server and the second servers, a write frequency of the first file and the second file;

switching a file storage mode that is currently applied to the second file to the second file storage mode in a case that the analyzed write frequency of the second file is more than a second threshold; and switching the file storage mode that is currently applied to the second file to the third file storage mode in a case that the analyzed write frequency of the second file is less than the second threshold.

2. The file storage method according to claim 1, further comprising:

receiving, by the first file server, an access request containing, as an access destination, a directory path that is unique throughout the computer system;

converting, by the first file server, the directory path contained in the received access request into a directory path that is unique throughout the respective second file servers; and sending, by the first file server, the access request in which the directory path has been converted to the relevant second file server.

3. The file storage method according to claim 1, wherein the first file server is coupled to a management computer, and wherein the file storage method further comprises notifying, by the first file server, when a file storage mode that is currently applied to the second file is switched to the second file storage mode or the third storage mode, the management computer of the completion of the switch of file storage modes.

4. The file storage method according to claim 1, further comprising confirming, by the first file server, upon receiving a snapshot obtaining request, that data write is completed in the storage subsystems that store files to which the second file storage mode is applied, and sending the snapshot obtaining request to the second file servers.

5. A computer system, comprising:
one first file server which is accessed by a client computer;
a plurality of second file servers which are coupled to the first file server via a network; and
a plurality of storage subsystems which are coupled to the second servers,
wherein at least one of the first server and the second servers applies to a first file, whose file size is less than a first threshold, stored in the storage subsystems a first file storage mode in which one file is stored in one of the storage subsystems;
wherein at least one of the first server and the second servers applies to a second file, whose file is more than the first threshold, one of a second file storage mode in which one file is stored in two or more of the storage subsystems that are coupled to different second file servers in a distributive manner, and a third file storage mode in which one file is stored in two or more of the storage subsystems that are coupled to one of second file servers in a distributive manner,
wherein the first file server integrates directory structures that are unique throughout the respective second file servers to provide the integrated directory structures as a directory structure that is unique throughout the computer system to the client computer, and
wherein at least one of the first server and the second servers analyzes a write frequency of the first file and the second file, and
wherein at least one of the first server and the second servers switches a file storage mode that is currently applied to the second file to the second file storage mode in a case that the analyzed write frequency of the second file is more than a second threshold,
wherein at least one of the first server and the second servers switches the file storage mode that is currently applied to the second file to the third file storage mode in a case that the analyzed write frequency of the second file is less than the second threshold.

6. The computer system according to claim 5,
wherein the first file server receives an access request containing, as an access destination, a directory path that is unique throughout the computer system,
wherein the first file server converts the directory path contained in the received access request into a directory path that is unique throughout the respective second file servers, and
wherein the first file server sends the access request in which the directory path has been converted to the relevant second file server.

7. The computer system according to claim 5,
wherein the first file server is coupled to a management computer, and
wherein, when a file storage mode that is currently applied to the second file is switched to the second file storage mode or the third file storage mode, the first server notifies the management computer of the completion of the switch of file storage modes.

8. The computer system according to claim 5, wherein, upon receiving a snapshot obtaining request, the first file server confirms that data write is completed in the storage subsystems that store files to which the second file storage mode is applied, and sends the snapshot obtaining request to the second file servers.

* * * * *